(12) United States Patent
Porter et al.

(10) Patent No.: US 8,110,214 B2
(45) Date of Patent: Feb. 7, 2012

(54) METHOD AND COMPOSITION FOR ENHANCING MILK PRODUCTION AND MILK COMPONENT CONCENTRATIONS

(75) Inventors: Paul A. Porter, Webster Groves, MO (US); Cindie M. Luhman, Webster Groves, MO (US)

(73) Assignee: Land O'Lakes Purina Feed LLC, Shoreview, MN (US)

(*) Notice: Subject to any disclaimer, the term of this patent is extended or adjusted under 35 U.S.C. 154(b) by 2036 days.

(21) Appl. No.: 10/745,286

(22) Filed: Dec. 23, 2003

(65) Prior Publication Data

US 2005/0142168 A1    Jun. 30, 2005

(51) Int. Cl.
A23K 1/18       (2006.01)

(52) U.S. Cl. .............. 424/438; 426/2; 426/53; 426/807; 514/738

(58) Field of Classification Search .................. None
See application file for complete search history.

(56) References Cited

U.S. PATENT DOCUMENTS

| | | |
|---|---|---|
| 2,876,157 A | 3/1959 | Selden |
| 3,338,718 A | 8/1967 | Olson et al. |
| 3,794,732 A | 2/1974 | Raun |
| 3,857,971 A | 12/1974 | Abdo et al. |
| 3,928,571 A | 12/1975 | Raun |
| 3,956,482 A * | 5/1976 | Hahn et al. ................ 424/93.3 |
| 3,959,493 A | 5/1976 | Baalsrud et al. |
| 4,127,676 A | 11/1978 | Merensalmi |
| 4,181,709 A | 1/1980 | Dannelly |
| 4,289,784 A | 9/1981 | Bochis et al. |
| 4,704,276 A | 11/1987 | Kantor |
| 4,735,735 A | 4/1988 | Borggrefe et al. |
| 4,735,809 A | 4/1988 | Donovan et al. |
| 4,876,097 A | 10/1989 | Autant et al. |
| 4,996,067 A | 2/1991 | Kobayashi et al. |
| 5,021,241 A | 6/1991 | Yamahira et al. |
| 5,137,735 A | 8/1992 | Bignon |
| 5,139,777 A | 8/1992 | Ott et al. |
| 5,145,695 A | 9/1992 | Smith et al. |
| 5,190,775 A | 3/1993 | Klose |
| 5,219,596 A | 6/1993 | Smith et al. |
| 5,236,718 A | 8/1993 | Huchette |
| 5,244,669 A | 9/1993 | Satoh et al. |
| 5,252,561 A | 10/1993 | Hornykiewytsch et al. |

(Continued)

FOREIGN PATENT DOCUMENTS

CA         600707        5/1960

(Continued)

OTHER PUBLICATIONS

Christensen et al—J. of Dairy Science—pp. 563,564 ; 1997.*

(Continued)

*Primary Examiner* — Neil Levy
(74) *Attorney, Agent, or Firm* — Dorsey & Whitney LLP; Devan V. Padmanabhan

(57) ABSTRACT

A method of feeding a ruminant that entails providing a feed that comprises sugar alcohol and at least one additional feed component, where the feed is free of rumen-protected fatty acid or comprises less than 10 weight percent rumen-protected fatty acid, based on the total weight of the feed and further entails orally supplying the feed to the ruminant during a pre-partum period when the ruminant is pregnant, where the ruminant ingests the feed and sugar alcohol during the pre-partum period.

84 Claims, 6 Drawing Sheets

U.S. PATENT DOCUMENTS

| | | | |
|---|---|---|---|
| 5,380,525 | A | 1/1995 | Leedle et al. |
| 5,474,785 | A | 12/1995 | Wright et al. |
| 5,496,571 | A | 3/1996 | Blagdon et al. |
| 5,503,112 | A | 4/1996 | Luhman et al. |
| 5,518,730 | A | 5/1996 | Fuisz |
| 5,529,793 | A | 6/1996 | Garner et al. |
| 5,547,686 | A | 8/1996 | Jenkins |
| 5,560,919 | A | 10/1996 | Morikawa et al. |
| 5,585,134 | A | 12/1996 | Cummings et al. |
| 5,660,852 | A | 8/1997 | McKeown et al. |
| 5,707,617 | A | 1/1998 | Conrad et al. |
| 5,741,506 | A | 4/1998 | Bauchart et al. |
| 5,807,594 | A | 9/1998 | King et al. |
| 5,843,498 | A | 12/1998 | Takahashi |
| 5,858,424 | A | 1/1999 | Virkki et al. |
| 5,958,464 | A * | 9/1999 | Register ............... 424/678 |
| 6,217,915 | B1 | 4/2001 | Luchansky et al. |
| 6,229,031 | B1 | 5/2001 | Strohmaier et al. |
| 6,306,427 | B1 | 10/2001 | Annonier et al. |
| 6,326,051 | B1 | 12/2001 | Nakasugi et al. |
| 6,440,447 | B1 | 8/2002 | Luhman |
| 6,866,861 | B1 | 3/2005 | Luhman |
| 2002/0127259 | A1 | 9/2002 | Orthoefer |
| 2003/0072788 | A1 | 4/2003 | Luhman |
| 2004/0142065 | A1 | 7/2004 | de Rodas et al. |

FOREIGN PATENT DOCUMENTS

| | | |
|---|---|---|
| CA | 645019 | 7/1962 |
| EP | 0998853 B1 | 5/2000 |
| GB | 838766 | 6/1960 |
| GB | 2159690 | 11/1985 |
| WO | WO 93/21782 A1 | 11/1993 |
| WO | WO 97/33488 A1 | 9/1997 |
| WO | WO 00/78160 A1 | 12/2000 |
| WO | WO 01/67879 A1 | 9/2001 |
| WO | WO 03/037102 A1 | 5/2003 |
| WO | WO 03/045401 | 6/2003 |
| WO | WO 03/090696 A1 | 11/2003 |

OTHER PUBLICATIONS

Ensminger—Feeds & Nutrition—1978—pp. 725,726.*

Ensminger—Animal Science=1977, pp. 567—Stage of Lactation.*

H. Khalili et. al.; The Effects of Added Glycerol or Unprotected Free Fatty Acids or a Combination of the Two on Silage Intake, Milk Production, Rumen Fermentation and Diet Digestibility in Cows Given Grass Silage Based Diets; Agric. Food Sci. Finland; vol. 6; Nos. 5-6; pp. 349-362; May 1997.

Remond, B, and Jacquier, Carole; Effet De L'addition De Sorbitol ÀLa Ration Des Vaches Laitières En Début De Lactation Sur Leurs Performances et Sur Quelques Paramétres Sanguins; Reprod Nutr. Dev. 26 (1 B); pp. 365-366; 1986. (Accompanied by English language translation—6 pages).

Makinen et al.; A Polyol Mixture in the Diet of Dairy Cows; Nutr. Rep. Int.; 23 (6); pp. 1077-1088; 1981.

Choung, Jai-Jun & Chamberlain, David; "The Effects of Abomasal Infusions of Casein or Soy-Bean-Protein Isolate on the Milk Production of Dairy Cows in Mid-Lactation;" pp. 103-115 (British Journal of Nutrition) 1993.

Abstract of Article entitled: "Abomasal Infusion of Glucose and Fat—Effect on Digestion, Production, and Ovarian and Uterine Functions of Cows" from 80:1315-1328 of 1997 *J. Dairy Sci*; Abstract published at http://www.aces.uiuc.edu/~gregm/adsa/jds/abs/97/Jul97/ab1315.html and dated Jul. 1997.

Abstract (pp. 538-539, Journal of British Society of Animal Production) of: L. Istasse & E.R. Orskov, "The Effects of Abomasal Infusions of Casein or Glucose on Milk Yield and on Some Blood Constituents of Diary Cows in Early and Late Lactation."

Abstract (Proceedings of the Nutrition Society, p. 65A, vol. 43, 1984) of: J.D. Oldham & J.A. Bines, "Milk Production in Cows Infused Abomasally with Casein, Glucose or Aspartic and Glutamic Acids Early in Lactation.".

Lister, Cliff J. and Smithard, Ronald R. ; Effects of Intraruminal Administration of Polyol to Sheep; J. Sci. Food Agric. 1984, 35, pp. 21-28.

Sauer, F.D., Erfle, J.D., Fisher, L.J.; *Propylene Glycol and Glycerol as a Feed Additive for Lactating Dairy Cows: An Evaluation of Blood Metabolite Parameters*; Canadian Journal of Animal Science; vol. 53, pp. 265-271 (1973).

Fisher, L.J., Erfle, J.D., Lodge, G.A.; Sauer, F.D.; *Effects of Propylene Glycol or Glycerol Supplementation of the Diet of Dairy Cows on Feed Intake, Milk Yield and Composition, and Incidence of Ketosis*; Canadian Journal of Animal Science; vol. 53; pp. 289-296 (1973).

* cited by examiner

METHOD AND COMPOSITION FOR ENHANCING MILK PRODUCTION AND MILK COMPONENT CONCENTRATIONS

CROSS-REFERENCE TO RELATED APPLICATION(S)

None.

BACKGROUND OF THE INVENTION

The present invention generally relates to a method and composition for enhancing fat-corrected milk production and milk component concentrations. More particularly, the present invention relates to a method and composition for enhancing milk production by ruminants and milk component concentrations in milk produced by ruminants.

Milk producers are continually looking for new compositions and methods that permit a selective increase in the amount of milk produced by ruminants. A number of advances have been made over the years in incrementally increasing milk production by ruminants. For example, various changes in the ingredient composition of ruminant feed have been made in attempts to coax ruminants into enhancing feed intake and/or water intake in attempts to increase the amount of milk produced by ruminants.

Additionally, some efforts have focused on modifying the feed composition to cause digestion of particular feed components in particular ruminant stomach components. For example, techniques exist for making certain feed components or feed additives, such as certain proteins, amino acids, and fatty acids rumen-inert. Such rumen-inert feed components or additives are prevented to some extent from being digested in the rumen and consequently are digested to some extent in stomach components other than the rumen, such as in the abomasum. Complicating matters further, care must be taken to assure a particular feeding change does not cause health problems in the ruminant, such as ruminal keratosis, abomasal displacement, or laminitis.

Milk producers are also interested in selectively increasing component concentrations in milk produced by ruminants to incrementally add value to the produced milk. Manufacturers of dairy products value milk having a higher solids content because such milk increases the yield of products made from the milk and components of the milk. Indeed, both in the United States and in many foreign countries, milk producers are paid for the milk on a graded scale based on the amount of fat, protein, or other measures of solids that are contained in the milk.

In this regard, the composition of milk produced by lactating dairy cows may be modified by judicious feeding of certain feed components or additives. For example, promotion of a low acetate:propionate ratio in the volatile fatty acids produced in the rumen of dairy cows is thought to cause a significant decrease in the percentage of milk fat, as well as, a minor increase in the percentage of milk protein in produced milk. This scheme, however, may cause health problems, including ruminal keratosis, displacement of the abomasum, and laminitis, in dairy cows that consume such a ration over extended periods of time. Another effort focused on modifying milk component concentration, specifically milk protein concentration, in ruminant-produced milk relies upon feeding rumen-inert amino acids, especially methionine and lysine.

Though the various ruminant feeding techniques that have been proposed and/or practiced over the years have enhanced the overall knowledge base with respect to ruminant feeding, these techniques have not adequately resolved the issue of how to most economically, efficiently, and effectively increase the amount of milk produced by ruminants and/or increase the concentration of milk components in ruminant-produced milk. Therefore, a need still exists for an improved method and composition for feeding ruminants that enhances the amount of milk produced by the ruminants and/or enhances the concentration of milk components in the ruminant-produced milk.

SUMMARY OF THE INVENTION

The present invention includes various methods of feeding a ruminant. One method entails providing a feed that comprises sugar alcohol and at least one additional feed component, where the feed is free of rumen-protected fatty acid or comprises less than 10 weight percent rumen-protected fatty acid, based on the total weight of the feed. This method further entails orally supplying the feed to the ruminant during a pre-partum period when the ruminant is pregnant, where the ruminant ingests the feed and sugar alcohol during the pre-partum period. The present invention further includes additional methods of feeding a ruminant.

DETAILED DESCRIPTION

Figure 1:
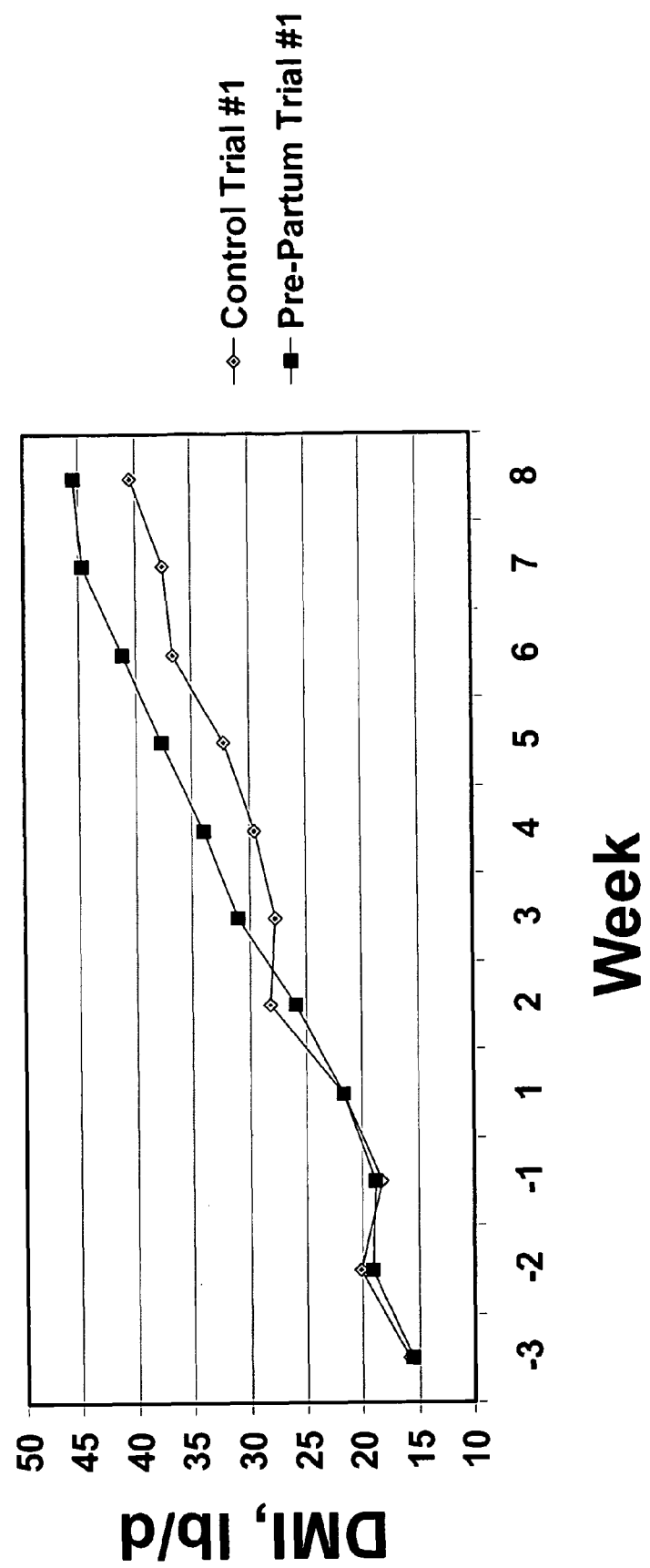
FIG. 1 is a graph depicting differences in dry matter intake in primiparous cows that are fed a control ration versus primiparous cows that are fed the control ration, along with sugar alcohol during a pre-partum period, in accordance with the present invention.

The present invention generally relates to a method and composition for enhancing fat-corrected milk production and milk component concentrations. More particularly, the present invention relates to a method and composition for enhancing fat-corrected milk production by ruminants and milk component concentrations in milk produced by ruminants. The methods and compositions each incorporate sugar alcohol.

It has been discovered that orally feeding sugar alcohol(s) to a female ruminant surprisingly causes subsequent increases in both the amount of fat-corrected milk produced by the female ruminant and increased milk component concentrations in the produced milk. Furthermore, the sugar alcohol feeding method of the invention enhances post-partum feed intake, on a dry matter basis. The sugar alcohol component of the feed, when initially provided prior to the onset of lactation, apparently improves the energy balance of the female ruminant. This improved energy balance apparently contributes to the increased fat-corrected milk production, the increased milk component concentrations in the produced milk, and the increased feed intake. This result is surprising since it has traditionally been thought that orally ingested sugar alcohol that is not ruminally-protected would be substantially, if not predominantly, digested in the rumen of the ruminants and would consequently cause negligible, if any, increases in ruminant milk production and milk component concentrations. Furthermore, in the course of formulating the feed of the present invention, no particular efforts are taken to create a feed composition that minimizes the residence time, and consequently digestion, of the sugar alcohol(s) in the rumen.

As used herein, the term "ruminant" means an even-toed hoofed animal that has a complex 3- or 4-chamber stomach and typically rechews previously swallowed feed matter. Some non-exhaustive examples of ruminants include cattle, sheep, goats, oxen, musk ox, llamas, alpacas, guanicos, deer, bison, antelopes, camels, and giraffes. The digestive tract of a cow, one example of the female ruminant that may be fed in accordance with the present invention, includes a stomach with four relatively distinct sections: a rumen, a reticulum, an omasum, and an abomasum. The four sections of the stomach may affect digestion of a component passing through the stomach because each section of the stomach serves a different function in the digestive process. In the rumen, food is mixed with saliva and then churned in a coordinated motion. The food mixture undergoes some fermentation and bacterial digestion in the rumen. The mixture of food and saliva then passes to the reticulum where the mixture is formed into a cud the cow may regurgitate and further chew. After thoroughly chewing the regurgitated cud, the cow re-swallows the cud which then passes into the rumen, through the reticulum, and into the omasum, if particle size restrictions are satisfied. While in the omasum, the mixture is additionally mixed to maintain the mixture in a homogenous state and to remove excess fluid. Then, the homogenous mixture is passed from the omasum to the abomasum, where gastric digestion occurs.

The feed composition administered in accordance with the present invention includes, or is orally fed to the ruminants along with, at least one sugar alcohol. As used herein, the term "sugar alcohol" is defined as a polyhydric alcohol (also known as a polyol) formed by the reduction of the carbonyl group of a sugar to a hydroxyl group, with no more than one hydroxy group being attached to any one carbon atom of the sugar alcohol. Sugar alcohol(s) included as part of the feed composition or added to the feed composition in accordance with the present invention may generally take any form(s). For example, the sugar alcohol(s) may be in crystalline form, in syrup form, an aqueous mixture of water and crystalline sugar alcohol(s), an aqueous mixture of water and sugar alcohol syrup, or in any combination of any of these different forms.

One exemplary sugar alcohol that may be used in practicing the present invention is sorbitol. Some other examples of sugar alcohols that may be used in practicing the present invention include adonitol; allitol; altritol (D-altritol, L-altritol, and D, L altritol); arabinitol (D-arabinitol, L-arabinitol, and D, L arabinitol); dulcitol (a.k.a galactitol); erythritol; galaxitol; glucitol (D-glucitol, L-glucitol, and D, L glucitol); glycerol; iditol (D-iditol and L-iditol); inositol; isomalt; lactitol; maltitol; mannitol (D-mannitol, L-mannitol, and D, L mannitol); perseitol; ribitol; rhamnitol; threitol (D-threitol, L-threitol, and D, L threitol); and xylitol. The sugar alcohols listed in this paragraph, in any combination and in any proportion, may be provided as part of, or along with, the feed composition. Though any mixture of the described sugar alcohols may be employed, any particular one of the described sugar alcohols may likewise be individually included in, or along with, any particular batch of the feed composition that is orally fed to the ruminants. As one non-exhaustive example, the sugar alcohol may include any, some, or all of the listed sugar alcohols in any combination or proportion. Also, the sugar alcohol(s) employed as part of, or along with, the feed composition, may exclude or be free of any of the listed alcohols, such as glycerol, for example.

The sugar alcohol(s) employed as part of the feed composition or that is added to the feed composition in accordance with the present invention need not be rendered rumen-inert or rumen-protected. Instead, beneficial aspects of the present invention are generally realized when sugar alcohol(s) that are fully digestible in the rumen of the ruminant are included as part of the feed composition, or are added to the feed composition, that is orally fed to the ruminants. Furthermore, in the course of formulating the feed of the present invention, no particular efforts need be taken to create the feed composition in a form that minimizes the residence time, and consequently digestion, of the sugar alcohol(s) in the rumen.

The feed composition and associated sugar alcohol(s) may be fed to female ruminants in accordance with the present invention (1) when the female ruminants are pregnant and are producing milk (i.e., are lactating), (2) when the female ruminants are pregnant and are not (or no longer are) lactating, and/or (3) after the female ruminants have given birth, are lactating and producing milk, but are not pregnant. Female ruminants that were previously lactating but are not presently lactating are commonly referred to in the dairy industry as being in a dry period. Pregnant female ruminants that were formerly lactating while pregnant typically have a dry period that extends from about two months before giving birth up until about the time of giving birth, though the dry period of a pregnant ruminant may sometimes start earlier than about two months before giving birth and may sometimes start later than about two months before giving birth. Pregnant female ruminants that were formerly lactating while pregnant, but are now in the dry period, are sometimes referred to as late-term pregnant ruminants.

For each individual pregnant ruminant (i.e., a "pre-partum ruminant"), the period when the feed composition and associated sugar alcohol(s) is provided to the pregnant ruminant prior to the pregnant ruminant giving birth is referred to herein as a pre-partum period, and may also be referred to as a pre-parturient period. For each individual female ruminant that has recently given birth (i.e., a "post-partum ruminant"), the period when the feed composition and associated sugar alcohol(s) is provided to the female ruminant soon after the female ruminant has given birth is referred to herein as an early post-partum period, and may also be referred to as an early post-parturient period.

The pre-partum period may generally be of any duration during the pregnancy of the pregnant ruminant and may start and end anytime during the pregnancy of the pregnant ruminant. Generally, however, the feed composition and associated sugar alcohol(s) are provided to the pregnant ruminant in accordance with the present invention during a pre-partum period that starts several weeks, such as about three to about four weeks, before the pregnant ruminant gives birth and ends shortly before, or even on the day the pregnant ruminant gives birth. Beneficially, the pre-partum period when the feed composition and associated sugar alcohol(s) are fed to female ruminants in accordance with the present invention begins at or after the onset of any dry period of pregnant ruminants, and particularly multiparous pregnant ruminants. Nonetheless, the feed composition and associated sugar alcohol(s) may be provided to the pregnant ruminant starting anytime during the pregnancy of the pregnant ruminant, such as about eight weeks, about seven weeks, about six weeks, about five weeks, about four weeks, about three weeks, about two weeks, or even only about one week before the pregnant ruminant gives birth.

Likewise, provision of the feed composition and associated sugar alcohol(s) to the pregnant ruminant may be ended anytime during the pregnancy of the pregnant ruminant, such as about four weeks, about three weeks, about two weeks, or about one week before the pregnant ruminant gives birth or even on the day the pregnant ruminant gives birth. In one embodiment, the feed composition and associated sugar alcohol(s) are provided to the pregnant ruminant during the pre-partum period that has a duration of about two weeks to about four weeks and ends at about the time the pregnant ruminant gives birth to improve feed intake (dry matter basis) by the female ruminant at the time the female ruminant gives birth and shortly after the female ruminant gives birth. Beneficially, provision of the feed composition and associated sugar alcohol(s) to the pregnant ruminant during the pre-partum period that has a duration of about two weeks to about four weeks and ends at about the time the pregnant ruminant gives birth may improve the energy balance of the female ruminant at the time the female ruminant gives birth and shortly after the female ruminant gives birth.

The early post-partum period may generally be of any duration after the female ruminant gives birth and may generally start anytime after the female ruminant gives birth and end anytime after the female ruminant gives birth. Generally, however, the feed composition and associated sugar alcohol(s) are provided to the female ruminant in accordance with the present invention during the early post-partum period that starts on the day the female ruminant gives birth or anytime during the first week after the female ruminant gives birth. Nonetheless, the feed composition and associated sugar alcohol(s) may be provided to the female ruminant starting anytime after the female ruminant gives birth, such as about one week, about two week, or even as long as about three weeks after the female ruminant gives birth.

Likewise, provision of the feed composition and associated sugar alcohol(s) to the female ruminant may be ended anytime after such early post-partum provision of the feed composition and associated sugar alcohol(s) to the female ruminant has been started, such as about one week, about two weeks, about three weeks, or about four weeks after the female ruminant gives birth. In one embodiment, the feed composition and associated sugar alcohol(s) are provided to the female ruminant during the early post-partum period that has a duration of about two weeks to about four weeks and starts at about the time the female ruminant gives birth to improve the energy balance of the female ruminant during the period immediately following when the female ruminant gives birth.

The feed composition and associated sugar alcohol(s) may be provided to the female ruminant both during the pre-partum period and during the early post-partum period to enhance benefits observed when practicing the present invention. As one example, the feed composition and associated sugar alcohol(s) may be provided to the female ruminant during a transition period starting about three to four weeks before the female ruminant gives birth through about the third or fourth week after the female ruminant gives birth. This six to eight week period that encompasses the pre-partum period of about three to four weeks duration ending with the birth coupled with the first three to four weeks following the birth during the early post-partum period is commonly referred to as the "transition period" of the cows in the cattle industry. Furthermore, cows that are traversing this six to eight week transition period are commonly referred to as transition cows.

Nevertheless, it is permissible to provide the feed composition and associated sugar alcohol(s) to the female ruminant only during the pre-partum period or only during the early post-partum period, since benefits of the inventive feeding protocol and formulation are observed when the feed composition and associated sugar alcohol(s) are orally provided to the female ruminant only during the pre-partum period or only during the early post-partum period. The feed composition and associated sugar alcohol(s) provided to the female ruminant during the pre-partum period may be different from the feed composition and associated sugar alcohol(s) provided to the female ruminant during the early post-partum period to adjust for differing energy balance compensations and nutritional needs of the female ruminant during these two different periods. Additionally, the sugar alcohol(s) may be orally provided to the female ruminant at a different rate during the pre-partum period, as compared to the early post-partum period, and vice versa, as desired.

Furthermore, the feed composition and associated sugar alcohol(s) provided to the female ruminant may permissibly vary during different portions of the pre-partum period to adjust for differing energy balance compensations and nutritional needs of the female ruminant during these different portions of the pre-partum period. Additionally, the rate at which the sugar alcohol(s) are orally provided to the female ruminant may permissibly vary during different portions of the pre-partum period to adjust for differing energy balance compensations and nutritional needs of the female ruminant during these different portions of the pre-partum period.

Similarly, the feed composition and associated sugar alcohol(s) provided to the female ruminant may permissibly vary during different portions of the early post-partum period to adjust for differing energy balance compensations and nutritional needs of the female ruminant during these different portions of the early post-partum period. Also, the rate at which the sugar alcohol(s) are orally provided to the female ruminant may permissibly vary during different portions of the early post-partum period to adjust for differing energy balance compensations and nutritional needs of the female ruminant during these different portions of the early post-partum period.

Generally, the feed composition that is orally fed to the ruminant may include any conventional ruminant feed component that is capable of being blended with the sugar alcohol(s) as part of the feed composition or that is capable of being combined with the feed composition of the present invention, so long as the feed components do not hinder ruminal, abomasal, or intestinal function and are not otherwise harmful to the ruminant. As noted above, in the course of formulating the feed of the present invention, no particular efforts need be taken to create the feed composition in a form that minimizes the residence time, and consequently digestion, of the sugar alcohol(s) in the rumen.

The sugar alcohol may be included as part of the feed composition, such as by including the sugar alcohol, in dry or syrup form, for example, in a feed concentrate that is incorporated in the feed composition. Alternatively, the sugar alcohol may be added to the feed composition as a post-treatment, after the feed composition has been placed in the feed trough of the ruminants that are being fed in accordance with the present invention. After top dressing the sugar alcohol onto the feed composition, it has been found beneficial to periodically stir the feed composition in front of the ruminants being fed. This stirring tends to draw the attention of the ruminants to the feed composition and thereby tends to cause the ruminants to eat some additional amount of the feed composition that includes or has been top dressed with sugar alcohol in accordance with the present invention.

Some non-exhaustive examples of feed components that may be included as part of the feed composition of the present invention include water, forage, beans (e.g., whole, cracked, or ground) or hulls thereof, grains (e.g., whole, cracked, or ground), oils made from beans or grain (e.g., oils based upon or derived from beans or grain, such as corn oil or soybean oil), meal or flour made from beans or grain (e.g., meal or flours oils based upon or derived from beans or grain, such as corn meal or soy flour, including high protein soy meal), syrups made from beans or grain (e.g., syrups based upon or derived from beans or grain, such as corn syrup), fatty acids, commercially available formula feeds, feed concentrates, and mixtures thereof.

Forages encompass hay, haylage, and silage. Some non-exhaustive examples of suitable hays include grass hays (e.g., sudangrass or orchardgrass), alfalfa hay, and clover hay. Some non-exhaustive examples of suitable haylages include grass haylages, such as haylage based on sudangrass or orchardgrass; sorghum haylage; and alfalfa haylage. One non-exhaustive example of suitable silages include corn silage. Some non-exhaustive examples of suitable beans and grains include corn, soybeans, and milo.

Feed concentrates are formulations prepared to include concentrated nutrients, such as protein for muscle promotion, fat and other carbohydrates that are readily convertible into energy, vitamins, and minerals. Some examples of components often included in feed concentrates are soybean hulls, sugar beet pulp, molasses, high protein soybean meal, ground corn, shelled corn, wheat midds, distillers grain, cottonseed hulls, rumen-bypass protein (also know as "rumen-inert protein" and as "rumen-protected protein"), rumen-bypass fat (also know as "rumen-inert fat" and as "rumen-protected fat"), and grease, such as choice white grease. One example of a suitable rumen-bypass protein is SUREPRO® rumen bypass protein that is available from Land O'Lakes Farmland Feed LLC of Arden Hills, Minn. One example of a suitable rumen-bypass fat is MEGALAC® rumen bypass fat that is available from Church & Dwight Co. of Princeton, N.J. Some examples of suitable formula feeds include Peak Plus® 37 formula feed, Fresh Tran Plus® formula feed, and Condition Plus® formula feed that are each available from Land O'Lakes Farmland Feed LLC and QLF® 4-19 formula feed that is available from Quality Liquid Feeds, Inc. of Dodgeville, Wis.

As used herein, the terms "rumen-bypass," "rumen-inert," and rumen-protected," when used to characterize a substance, such as fat, protein, carbohydrate, etc., means the substance is naturally-resistant, to some degree, to alternation during passage of the rumen-bypass substance through the rumen of a ruminant and/or means the substance has been processed, treated, or associated with another material in some fashion that protects, to some degree, the rumen-bypass substance from alternation during passage of the rumen-bypass substance through the rumen of a ruminant.

The feed composition of the present invention may be free of rumen-protected fatty acid or may include rumen-protected free fatty acid. If rumen-protected fatty acid is included in the feed composition, the feed composition will typically contain less than ten weight percent rumen-protected fatty acid, based on the total weight of the feed composition. In many embodiments, if the rumen-protected fatty acid is included in the feed composition, the feed composition may generally contain about five weight percent or less rumen-protected fatty acid, based on the total weight of the feed composition.

The term "silage," as used herein, is defined to mean vegetable matter, other than grass or hay, that has been converted within a silo into a feed for livestock through any of various anaerobic acid fermentation processes. A wide variety of vegetable matter, such as corn, beans, peas, alfalfa, and the like, may be converted within silos into silage. Vegetable matter that is converted into silage is typically harvested while still relatively tender, soft, and relatively high in moisture content and is frequently chopped prior to placement in the silo for conversion to silage. As used herein, the term "silo" encompasses any and all types of structures used to produce silage (e.g., vertical silos, trench silos, silage bags, HARVESTORE® structures, and the like).

The term "haylage," as used herein, is defined to mean hay or grass that has been converted within a silo into a feed for livestock through any of various anaerobic acid fermentation processes. Haylage is somewhat similar to silage, but instead of being based on non-hay/non-grass vegetable matter, is instead based on hay or grass. The hay or grass that is converted into haylage is typically harvested while still relatively green, tender, soft, and high in moisture content and is frequently chopped into particles prior to placement in the silo for conversion to haylage.

Some exemplary components and component concentration ranges for the feed composition provided to female ruminants during the pre-partum period are detailed in Table 1 below.

TABLE 1

| Component | Weight Percent (Dry Basis)* |
| --- | --- |
| Corn Silage (38% DM) | 0 to about 40 |
| Feed Concentrate | about 25 to about 45 |
| Grass Hay | about 10 to about 30 |
| Alfalfa Hay | 0 to about 40 |
| Alfalfa Haylage | 0 to about 40 |

*Based on Total Dry Matter Weight of the Feed Composition Provided During The Pre-Partum Period Some exemplary components and component concentration ranges for feed concentrates incorporated in the feed composition provided to female ruminants during the pre-partum period are detailed in Table 2 below.

TABLE 2

| Component | Weight Percent (Dry Basis)* |
| --- | --- |
| Soybean Hulls | 0 to about 25 |
| Sugar Beet Pulp | 0 to about 25 |

TABLE 2-continued

| Component | Weight Percent (Dry Basis)* |
| --- | --- |
| Soybean Meal (48 wt % true protein) | 0 to about 25 |
| Ground Corn & Shelled Corn | 0 to about 25 |
| Wheat Midds | 0 to about 25 |
| Cottonseed Hulls | 0 to about 15 |
| LOL SurePro ® rumen bypass protein | 0 to about 10 |
| Vitamins & Minerals | about 2 to about 5 |

*Based on Total Dry Matter Weight of the Feed Composition Provided During The Pre-Partum Period One commercially available feed concentrate that includes all of the components listed in Table 2 at concentrations falling within the concentration ranges detailed in Table 2 is TRANSCOW® Complete 20 Pre-Fresh ration available from Land O'Lakes Farmland Feed, LLC.

Any dosage of sugar alcohol(s) may be ingested by female ruminants during the pre-partum period in accordance with the present invention. The sugar alcohol(s) ingested by the female ruminant(s) during the pre-partum period preferably includes an amount of sugar alcohol(s) that is effective (i.e. an effective amount) to increase one or more of the following variables A, B, C, D, E, F, and/or G and/or decrease the following variable H:

A. the quantity (weight) of milk produced during the entire interval, or any portion of the interval, when the female ruminant(s) subsequently produce(s) milk while lactating after giving birth;

B. the quantity (weight) of 4 weight % fat-corrected milk (based on the total weight of the milk) produced during the entire interval, or any portion of the interval, when the female ruminant(s) subsequently produce(s) milk while lactating after giving birth;

C. the concentration of total fat in milk produced during the entire interval, or any portion of the interval, when the female ruminant(s) subsequently produce(s) milk while lactating after giving birth;

D. the concentration of true protein in milk produced during the entire interval, or any portion of the interval, when the female ruminant(s) subsequently produce(s) milk while lactating after giving birth;

E. the concentration of lactose in milk produced during the entire interval, or any portion of the interval, when the female ruminant(s) subsequently produce(s) milk while lactating after giving birth;

F. the concentration of total solids in milk produced during the entire interval, or any portion of the interval, when the female ruminant(s) subsequently produce(s) milk while lactating after giving birth;

G. feed composition intake (dry weight basis) during the interval, or any portion of the interval, when the female ruminant(s) subsequently produce(s) milk while lactating after giving birth; and/or H. the concentration of non-esterified fatty acid (NEFA) in the blood of the female ruminant(s) at the time the female ruminant(s) give(s) birth, anytime during the pre-partum period, or anytime after the female ruminant(s) give(s) birth and subsequently produce(s) milk;

as compared to the value of the variable(s) A, B, C, D, E, F, G, and/or H exhibited by any comparative female ruminant(s) that does not ingest any sugar alcohol(s) during the pre-partum period.

The sugar alcohol(s) ingested by the female ruminant(s) during the pre-partum period in accordance with the present invention preferably includes an amount of sugar alcohol(s) that is effective, over an eight week period starting on the day of calving or over any portion of this eight week period, to:

increase the dry matter feed intake of the female ruminant(s) by at least about five percent, and desirably by at least about eight percent;

increase the rate of milk production by the female ruminant(s) by at least about five percent, and desirably by at least about eight percent;

increase the rate of 4% fat-corrected milk production by the female ruminant(s) by at least about five percent, and desirably by at least about ten percent;

increase the concentration of true protein in milk produced by the female ruminant(s) by at least about two percent, and desirably by at least about four percent;

increase the concentration of fat in milk produced by the female, ruminant(s) by at least about five percent, and desirably by at least about ten percent;

increase the concentration of lactose in milk produced by the female ruminant(s) by at least about one percent, and desirably by at least about three percent;

increase the concentration of total solids in milk produced by the female ruminant(s) by at least about one percent, and desirably by at least about three percent;

decrease the NEFA concentration in the blood of the female ruminant(s) by at least about ten percent, and desirably by at least about twenty percent, anytime during the pre-partum period or anytime after the pre-partum ruminant(s) give(s) birth and subsequently produce(s) milk; and/or decrease the NEFA concentration in the blood of the female ruminant(s) by at least about thirty percent, and desirably by at least about forty percent, anytime within the period extending from about one to about two days before the female ruminant(s) give(s) birth to about one to about two days after the female ruminant(s) give(s) birth;

as compared to any pre-partum ruminant(s) that does not ingest any sugar alcohol(s) during the pre-partum period.

Some non-exhaustive examples of suitable daily sugar alcohol ingestion rates by female ruminant(s) during the pre-partum period that are believed effective to increase one or more of the variable(s) A, B, C, D, E, F, and/or G and/or decrease the variable H associated with the female ruminant(s), as compared to the value of the variable(s) A, B, C, D, E, F, G, and/or H exhibited by any comparative female ruminant(s) that does(do) not ingest any sugar alcohol(s) during the pre-partum period, are ingestion rates ranging from about five grams per day per ruminant to about two hundred grams per day per female ruminant of any individual sugar alcohol or any mixture of any sugar alcohols and more typically from about fifty grams per day per female ruminant to about two hundred grams per day per female ruminant of any individual sugar alcohol or any mixture of any sugar alcohols. As an alternative approach, the ingestion rate during the pre-partum period ranging from about five grams per day per female ruminant to about two hundred grams per day per female ruminant of any individual sugar alcohol or any mixture of any sugar alcohols may permissibly be an ingestion rate over the pre-partum period or any portion of the pre-partum period that ranges from an average of about five grams per day per female ruminant to an average of about two hundred grams per day per female ruminant of any individual sugar alcohol or any mixture of any sugar alcohols over the pre-partum period or portion of the pre-partum period. Also, as another alternative approach, the more typical ingestion rate during the pre-partum period ranging from about fifty grams per day per female ruminant to about two hundred grams per day per female ruminant of any individual sugar alcohol or any mixture of any sugar alcohols may permissibly be an ingestion rate over the pre-partum period or any portion of the pre-partum period that ranges from an average of about fifty grams per day per female ruminant to an average of about two hundred grams per day per female ruminant of any individual sugar alcohol or any mixture of any sugar alcohols over the pre-partum period or portion of the pre-partum period.

Two non-exhaustive, though exemplary, daily sugar alcohol ingestion rates by female ruminant(s) during the pre-partum period within the range presented immediately above that are effective to increase one or more of the variable(s) A, B, C, D, E, F, and/or G and/or decrease the variable H associated with the female ruminant(s), as compared to the value of the variable(s) A, B, C, D, E, F, G, and/or H exhibited by any comparative female ruminant(s) that does not ingest any sugar alcohol(s) during the pre-partum period, are (1) a daily sugar alcohol ingestion rate of about seventy-five grams to about one hundred grams of any individual sugar alcohol or any mixture of any sugar alcohols per female ruminant per day and (2) a daily sugar alcohol ingestion rate of about one hundred fifty to about one hundred eighty grams of any individual sugar alcohol or any mixture of any sugar alcohols per female ruminant per day.

As an alternative approach to the daily sugar alcohol ingestion rate ranging from about seventy-fifty grams to about one hundred grams of sugar alcohol(s) per female ruminant during the pre-partum period, the sugar alcohol ingestion rate may permissibly be an ingestion rate the pre-partum period or any portion of the pre-partum period that ranges from an average of about seventy-five, grams per day per female ruminant to an average of about one hundred grams per day per female ruminant of any individual sugar alcohol or any mixture of any sugar alcohols over the pre-partum period or portion of the pre-partum period. Likewise, as an alternative approach to the daily sugar alcohol ingestion rate ranging from about one hundred fifty grams to about one hundred eighty grams of sugar alcohol(s) per female ruminant, the sugar alcohol ingestion rate may permissibly be an ingestion rate over the pre-partum period or any portion of the pre-partum period that ranges from an average of about one hundred fifty grams per day per female ruminant to an average of about one hundred eighty grams per day per female ruminant of any individual sugar alcohol or any mixture of any sugar alcohols over the pre-partum period or any portion of the pre-partum period.

Some exemplary components and component concentration ranges for the feed composition provided to female ruminants during the early post-partum period are detailed in Table 3 below.

TABLE 3

| Component | Weight Percent (Dry Basis)* |
|---|---|
| Corn Silage (32% DM) | 0 to about 45 |
| Haylage (31% DM) | 0 to about 45 |
| Alfalfa Hay (160 FRV) | 0 to about 45 |
| Grass Hay | 0 to about 15 |
| Concentrate | about 30 to about 70 |

*Based on Total Dry Matter Weight of the Feed Composition Provided During The Early Post-Partum Period Some exemplary components and component concentration ranges for feed concentrates incorporated in the feed composition provided to female ruminants during the early post-partum period are detailed in Table 4 below.

TABLE 4

| Component | Weight Percent (Dry Basis)* |
|---|---|
| Soybean Hulls | 0 to about 20 |
| Molasses | 0 to about 3 |
| Soybean Meal (48 wt % true protein) | 0 to about 20 |
| Ground Corn & Shelled Corn | about 10 to about 25 |
| Distiller Grain | 0 to about 15 |
| Wheat Midds | 0 to about 20 |
| Whole Cottonseed | 0 to about 15 |
| LOL SUREPRO ® Rumen Bypass Protein | about 1 to about 10 |
| MEGALAC ® Rumen Bypass Fat | 0 to about 3 |
| Choice White Grease | 0 to about 2 |
| Vitamins & Minerals | about 2 to about 10 |

*Based on Total Dry Matter Weight of the Feed Composition Provided During The Early Post-Partum Period Any dosage of sugar alcohol(s) may be ingested by female ruminants during the early post-partum period in accordance with the present invention. The combination of the sugar alcohol(s) ingested by the ruminant(s) during the pre-partum period and the sugar alcohol(s) ingested by the ruminant(s) during the subsequent early post-partum period preferably includes amounts of sugar alcohol(s) that are effective (i.e. an effective amount) to increase one or more of the following variables I, J, K, L, M, N, and/or O:

I. the quantity (weight) of milk produced during the entire interval, or any portion of the interval, when the female ruminant(s) produce(s) milk while lactating during or following the early post-partum period;

J. the quantity (weight) of 4 weight % fat-corrected milk (based on the total weight of the milk) produced during the entire interval, or any portion of the interval, when the female ruminant(s) produce(s) milk while lactating during or following the early post-partum period;

K. the concentration of total fat in milk produced during the entire interval, or any portion of the interval, when the female ruminant(s) when the female ruminant(s) produce(s) milk while lactating during or following the early post-partum period;

L. the concentration of true protein in milk produced during the entire interval, or any portion of the interval, when the female ruminant(s) when the female ruminant(s) produce(s) milk while lactating during or following the early post-partum period;

M. the concentration of lactose in milk produced during the entire interval, or any portion of the interval, when the female ruminant(s) when the female ruminant(s) produce(s) milk while lactating during or following the early post-partum period;

N. the concentration of total solids in milk produced during the entire interval, or any portion of the interval, when the female ruminant(s) when the female ruminant(s) produce(s) milk while lactating during or following the early post-partum period; and/or O. feed composition intake (dry weight basis) during the interval, or any portion of the interval, when the female ruminant(s) when the female ruminant(s) produce(s) milk while lactating during or following the early post-partum period;

as compared to the value of the variable(s) I, J, K, L, M, N, and/or O exhibited by any comparative female ruminant(s) that do not ingest any sugar alcohol(s) during the pre-partum period and/or do not ingest any sugar alcohol(s) during the subsequent early post-partum period.

The sugar alcohol(s) ingested by the female ruminant(s) during the early post-partum period and during the pre-partum period in accordance with the present invention preferably includes an amount of sugar alcohol(s) that is effective, over an eight week period starting on the day of calving or over any portion of this eight week period, to:

increase the dry matter feed intake of the female ruminant(s) by at least about five percent, and desirably by at least about eight percent;

increase the rate of milk production by the female ruminant(s) by at least about five percent, and desirably by at least about eight percent;

increase the rate of 4% fat-corrected milk production by the female ruminant(s) by at least about eight percent, and desirably by at least about twelve percent;

increase the concentration of true protein in milk produced by the female ruminant(s) by at least about three percent, and desirably by at least about six percent;

increase the concentration of fat in milk produced by the female ruminant(s) by at least about eight percent, and desirably by at least about twelve percent;

increase the concentration of lactose in milk produced by the female ruminant(s) by at least about two percent, and desirably by at least about four percent; and/or increase the concentration of total solids in milk produced by the female ruminant(s) by at least about two percent, and desirably by at least about four percent;

as compared to any female ruminant(s) that does not ingest any sugar alcohol(s) during the pre-partum period and/or during the early post-partum period.

Some non-exhaustive examples of suitable daily sugar alcohol ingestion rates by the female ruminant(s) during the pre-partum period and by the female ruminant(s) during the subsequent early post-partum period that are believed effective to increase one or more of the variable(s) I, J, K, L, M, N, and/or O associated with the female ruminant(s), as compared to the value of the variable(s) exhibited by any comparative female ruminant(s) that do not ingest any sugar alcohol(s) during the pre-partum period and/or do not ingest any sugar alcohol(s) during the subsequent early post-partum period, are ingestion rates ranging from about five grams per day per female ruminant to about two hundred grams per day per female ruminant of any individual sugar alcohol or any mixture of any sugar alcohols and more typically from about fifty grams per day per female ruminant to about two hundred grams per day per female ruminant of any individual sugar alcohol or any mixture of any sugar alcohols. As an alternative approach, the ingestion rate ranging from about five grams per day per female ruminant to about two hundred grams per day per female ruminant of any individual sugar alcohol or any mixture of any sugar alcohols may permissibly be an ingestion rate over the pre-partum period (or any portion of the pre-partum period) and over the early post-partum period (or any portion of the early post-partum period) that ranges from an average of about five grams per day per female ruminant to an average of about two hundred grams per day per female ruminant of any individual sugar alcohol or any mixture of any sugar alcohols over the pre-partum period (or any portion of the pre-partum period) and over the early post-partum period (or any portion of the early post-partum period). Also, as an alternative approach, the more typical ingestion rate ranging from about fifty grams per day per female ruminant to about two hundred grams per day per female ruminant of any individual sugar alcohol or any mixture of any sugar alcohols may permissibly be an ingestion rate that ranges from an average of about fifty grams per day per female ruminant to an average of about two hundred grams per day per female ruminant of any individual sugar alcohol or any mixture of any sugar alcohols over the pre-partum period (or any portion of the pre-partum period) and over the early post-partum period (or any portion of the early post-partum period).

Two non-exhaustive, though exemplary, daily sugar alcohol ingestion rates by the female ruminant(s) during the pre-partum period and by the female ruminant(s) during the subsequent early post-partum period within the range presented immediately above that are effective to increase one or more of the variable(s) I, J, K, L, M, N, and/or O associated with the female ruminant(s), as compared to the value of the variable(s) I, J, K, L, M, N, and/or O exhibited by any comparative female ruminant(s) that do not ingest any sugar alcohol(s) during the pre-partum period and/or do not ingest any sugar alcohol(s) during the subsequent early post-partum period, are (1) a daily sugar alcohol ingestion rate of about seventy-five grams to about one hundred grams of any individual sugar alcohol or any mixture of any sugar alcohols per female ruminant per day and (2) a daily sugar alcohol ingestion rate of about one hundred fifty to about one hundred eighty grams of any individual sugar alcohol or any mixture of any sugar alcohols per female ruminant per day.

As an alternative approach to the daily sugar alcohol ingestion rate ranging from about seventy-fifty grams to about one hundred grams of sugar alcohol(s) per female ruminant over the pre-partum period (or any portion of the pre-partum period) and over the early post-partum period (or any portion of the early post-partum period), the sugar alcohol ingestion rate may permissibly be an ingestion rate that ranges from an average of about seventy-five grams per day per female ruminant to an average of about one hundred grams per day per female ruminant of any individual sugar alcohol or any mixture of any sugar alcohols over the pre-partum period (or any portion of the pre-partum period) and over the early post-partum period (or any portion of the early post-partum period). Likewise, as an alternative approach to the daily sugar alcohol ingestion rate ranging from about one hundred fifty grams to about one hundred eighty grams of sugar alcohol(s) per female ruminant over the pre-partum period (or any portion of the pre-partum period) and over the early post-partum period (or any portion of the early post-partum period), the sugar alcohol ingestion rate may permissibly be an ingestion rate over any portion that ranges from an average of about one hundred fifty grams per day per female ruminant to an average of about one hundred eighty grams per day per female ruminant of any individual sugar alcohol or any mixture of any sugar alcohols over the pre-partum period (or any portion of the pre-partum period) and over the early post-partum period (or any portion of the early post-partum period).

Following the early postpartum period, the lactating ruminants may be fed according to any appropriate feeding protocol to optimize milk production, milk component production, ruminant feed intake, and/or ruminant health parameters, as desired. Some exemplary components and component concentration ranges for feed compositions that may be provided to female ruminants following the early post-partum period are detailed in Table 5 below.

TABLE 5

| Component | Weight Percent (Dry Basis)* |
|---|---|
| Corn Silage (32% DM) | about 25 to about 30 |
| Cracked Corn | about 15 to about 20 |
| Alfalfa Hay | about 10 to about 15 |
| Alfalfa Haylage | about 10 to about 15 |
| Peak Plus ® 37 Formula Feed | about 5 to about 10 |

TABLE 5-continued

| Component | Weight Percent (Dry Basis)* |
| --- | --- |
| Fresh Tran Plus ® Formula Feed | about 8 to about 13 |
| Condition Plus ® Formula Feed | about 3 to about 6 |
| QLF ® 4-19Formula Feed | about 3 to about 6 |

*Based on Total Dry Matter Weight of the Feed Composition Provided After the Early Post-Partum Period Peak Plus® 37 formula feed, Fresh Tran Plus® formula feed, and Condition Plus® formula feed are each available from Land O'Lakes Farmland Feed, LLC, Inc. of Arden Hills, Minn., and QLF® 4-19 formula feed is available from Quality Liquid Feeds, Inc. of Dodgeville, Wis.

As part of the feed composition provided after the early post-partum period or along with the feed composition provided after the early postpartum period, the lactating ruminants may optionally be provided with any sugar alcohol or any mixture or combination of different sugar alcohols to help optimize milk production, milk component production, ruminant feed intake, and/or ruminant health parameters, as desired. Some non-exhaustive examples of suitable daily sugar alcohol ingestion rates by female ruminant(s) after the early postpartum period are ingestion rates ranging from about five grams per day per female ruminant to about two hundred grams per day per female ruminant of any individual sugar alcohol or any mixture of any sugar alcohols.

Various analytical techniques are employed herein. An explanation of these techniques follows. All values presented in this document for a particular parameter, such as weight percent true protein, weight percent fat, weight percent lactose, weight percent non-protein nitrogen, and weight percent total solids, are based on the "as is" sample and are therefore on a "wet basis", unless otherwise specified herein.

PROPERTY DETERMINATION AND CHARACTERIZATION TECHNIQUES

Dry Matter Basis Determination

To determine the dry matter weight (or dry matter basis or dry basis) of a particular sample, the sample is first weighed. The weighed sample is then dried in an oven at a temperature that is adequate to drive off moisture from the sample without degrading the sample components, such as a temperature ranging from about 100° C. to about 110° C. The oven drying is continued until the weight of the dried sample remains constant, despite additional oven drying.

Total Solids Determination

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (16th Ed., 1995). The weight percent total solids, wet basis, is then calculated by dividing the actual weight of total solids by the actual weight of the sample.

Total Protein Determination

To determine the percent of total protein, wet basis, in a sample, the actual weight of total protein is determined in accordance with Method #991.20 (33.2.11) of *Official Methods of Analysis*, Association of Official Analytical Chemists (AOAC) (16th Ed., 1995). The value determined by the above method yields "total Kjeldahl nitrogen," which is equivalent to "total protein" since the above method incorporates a factor that accounts for the average amount of nitrogen in protein. Since any and all total Kjeldahl nitrogen determinations presented herein are based on the above method, the terms "total Kjeldahl nitrogen" and "total protein" are used interchangeably herein. Furthermore, those skilled in the art will recognize that the term "total Kjeldahl nitrogen" is generally used in the art to mean "total protein" with the understanding that the factor has been applied. The weight percent total protein, wet basis, is calculated by dividing the actual weight of total protein by the actual weight of the sample.

True Protein Determination

The weight percent of true protein, wet basis, for a particular sample is calculated after first determining the wet basis weight percent of total Kjeldahl nitrogen and the wet basis weight percent of non-protein nitrogen in the sample. The wet basis weight percent of total Kjeldahl nitrogen in the sample is determined using the method referenced above. The wet basis weight percent of non-protein nitrogen (NPN) in the sample is determined in accordance with Method #991.21 (33.2.12) of *Official Methods of Analysis*, Association of Official Analytical Chemists (AOAC) (16th Ed., 1995). The weight percent of true protein, wet basis, in the sample is then determined by subtracting the wet basis weight percent of non-protein nitrogen in the sample from the wet basis weight percent of total Kjeldahl nitrogen in the sample.

Lactose Determination

To determine the weight percent lactose, wet basis, in a liquid sample, the weight of the liquid sample is first determined. The actual weight of lactose in the liquid sample may then be determined using analysis kit number 176-303, that is available from Boehringer-Mannheim of Indianapolis, Ind. in accordance with the procedural instructions included with analysis kit number 176-303. The weight percent lactose, wet basis, in the liquid sample is then calculated by dividing the actual weight of lactose in the liquid sample by the actual weight of the liquid sample.

Fat Determination

To determine the weight percent total fat, wet basis, in a sample, the actual weight of fat in the sample is determined in accordance with Method #974.09 (33.7.18) of *Official Methods of Analysis*, Association of Official Analytical Chemists (AOAC) (16th Ed., 1995). The weight percent total fat, wet basis, is then calculated by dividing the actual weight of fat in the sample by the actual weight of the sample.

Fat-Corrected Milk

To convert a particular quantity (weight) of a milk sample to the quantity (weight) of Fat-Corrected Milk, based on a correction to a concentration of four weight percent fat, based on the total weight off the Fat-Corrected Milk, the following equation is employed:

$$4 \text{ wt \% FCM} = \text{Original Milk Weight} \times (0.4 + (0.15 \times \% \text{TF}_{OM}))$$

where:
the term 4 wt % FCM means the calculated weight of Fat-Corrected Milk, based on a correction to a concentration of four weight percent fat, based on the total weight of the Fat-Corrected Milk, the term Original Milk Weight means the weight of the original milk sample that is being corrected to a four weight percent fat basis, and % $TF_{OM}$ is the weight % total fat in the original milk sample, based on the total weight of the original milk sample.

Non-Esterified Fatty Acid Determination

To determine the weight percent of non-esterified fatty acid NEFA, wet basis, in a sample of blood, the blood sample is analyzed by an enzymatic calorimetric method (ACS-ACOD) using the NEFA C diagnostic kit (WAKO Chemicals USA, Richmond, Va.) in combination with an Hitachi 704 Automated Chemistry Analyzer (Hitachi Ltd., Tokyo, Japan). The enzymatic colorimetric method utilizes acyl-CoA synthethase (ACS) and acyl-CoA oxidase (ACOD) to produce a substance that may be measured calorimetrically. The NEFA analysis is conducted in accordance with the NEFA C ACS-ACOD Method instructions that WAKO Chemicals USA provides along with the NEFA C diagnostic kit.

The present invention is more particularly described in the following examples which are intended as illustrations only since numerous modifications and variations within the scope of the present invention will be apparent to those skilled in the art.

EXAMPLES

Example One and Example Two provided below demonstrate effects of feeding female ruminants a control feed in combination with sugar alcohol, during a pre-partum period only, in accordance with the present invention, as compared to the effects of feeding female ruminants during the pre-partum period with the control feed in the absence of any sugar alcohol. Example Two provided below further demonstrates effects of feeding female ruminants the control feed in combination with sugar alcohol during both a pre-partum period and a post birth period, in accordance with the present invention, as compared to effects of feeding female ruminants during both the pre-partum period and the post birth period with the control feed in the absence of the sugar alcohol.

In Examples One and Two, the pre-partum period extended from three weeks prior to the pregnant ruminants giving birth (designated as "week −3") and ended at the time the pregnant ruminants gave birth. Thus, in Examples One and Two, the pre-partum period extended from week −3 through week −1. Also, in Examples One and Two, the early post-partum period extended from the day the female ruminants gave birth (i.e., "week +1") and ended four weeks after the female ruminants gave birth. Thus, in Examples One and Two, the early post-partum period extended from week +1 through week +4.

Furthermore, each trial conducted in support of Examples One and Two extended beyond the early post-birth period, namely from the fifth week after the female ruminants gave birth (i.e., "week +5") through the eight week after the female ruminants gave birth (i.e., "week +8"). However, the feeding regimen from week +5 through week +8 during the feeding trials of Example One differed from the feeding regimen from week +5 through week +8 during the feeding trials of Example Two. On the other hand, the feeding regimens from week +5 through week +8 for the different feeding trials of Example One were all the same, or essentially the same, as each other. Likewise, the feeding regimen from week +5 through week +8 for the different feeding trials of Example Two were all the same, or essentially the same, as each other.

Six separate trials are reflected in Examples One and Two. Two of the trials are encompassed within Example One, and four of the trials are encompassed within Example Two. Each of the six different trials extended from week −3 of the pre-partum period, through the entire early post birth period (i.e., from week +1 through week +4), and ended at the end of week +8. There were two control trials (Control Trial #1 and Control Trial #2), and there were four separate trials in accordance with the present invention.

When reference is made herein to the (or both) "Control Trials," it is to be understood this is a reference to both Control Trial #1 and Control Trial #2, unless otherwise indicated. In both control trials, a pre-partum control feed was provided during the pre-partum period (weeks −3 through −1) and a first post-partum control feed was provided during the early post-partum period (weeks +1 through +4). No sugar alcohol was included in or provided along with the pre-partum control feed during the pre-partum period in either of the control trials, and no sugar alcohol was included in or provided along with the first post-partum control feed during the early post-partum period in either of the two control trials.

In Control Trial #1, a second post-partum control feed that did not include any sugar alcohol was provided from week +5 through week +8. On the other hand, in Control Trial #2, a third post-partum control feed that was modified to include sugar alcohol was provided from week +5 through week +8. The second post-partum control feed and the third post-partum control feed were the same, or essentially the same, with the exception that the second postpartum control feed did not include any sugar alcohol, whereas the third postpartum control feed did include sugar alcohol.

The third and fourth trials, which individually and collectively represent one approach to practicing the present invention, are referred to herein as Pre-Partum Trial #1 and Pre-Partum Trial #2. When reference is made herein to the (or both) "Pre-Partum Trials," it is to be understood this is a reference to both Pre-Partum Trial #1 and Pre-Partum Trial #2, unless otherwise indicated. In both Pre-Partum Trials, the pre-partum control feed was provided during the pre-partum period (weeks −3 through −1) and the first postpartum control feed was provided during the early postpartum period (weeks +1 through +4). The pre-partum control feed used in both Pre-Partum Trials during the pre-partum period was modified, as indicated below, to incorporate a particular sorbitol dosage. No sugar alcohol was included in or provided along with the first postpartum control feed fed to the female ruminants of either Pre-Partum Trial during the early postpartum period.

In Pre-Partum Trial #1, the second postpartum control feed that did not include any sugar alcohol was provided from week +5 through week +8. On the other hand, in Pre-Partum Trial #2, the third postpartum control feed that did include sugar alcohol was provided from week +5 through week +8. Again, the second postpartum control feed and the third postpartum control feed were the same, or essentially the same, with the exception that the second postpartum control feed did not include any sugar alcohol, whereas the third postpartum control feed did include sugar alcohol.

The fifth trial, which represents another approach to practicing the present invention, is referred to herein as Pre/Post Trial #1. In Pre/Post Trial #1, the pre-partum control feed was provided during the pre-partum period (weeks −3 through −1), the first post-partum control feed was provided during the early post-partum period (weeks +1 through +4), and the second post-partum control feed was provided from week +5 through week +8. The pre-partum control feed used in Pre/Post Trial #1 during the pre-partum period was modified, as indicated below, to incorporate a particular sorbitol dosage. The first post-partum control feed used in Pre/Post Trial #1 during the early post-partum period was modified, as indicated below, to incorporate a particular sorbitol dosage. Also, the third post-partum control feed used in Pre/Post Trial #1 during weeks +5 through +8 following the early post-partum period incorporated a particular sorbitol dosage, as indicated below.

A sixth trial, which represents yet another approach to practicing the present invention, is referred to herein as Pre/Post Trial #2. In Pre/Post Trial #2, the pre-partum control feed was provided during the pre-partum period (weeks −3 through −1), the first post-partum control feed was provided during the early post-partum period (weeks +1 through +4), and the third post-partum control feed was provided from week +5 through week +8. The pre-partum control feed used in Pre/Post Trial #2 during the pre-partum period was modified, as indicated below, to incorporate a particular sorbitol dosage. The first post-partum control feed used in Pre/Post Trial #2 during the early post-partum period was modified, as indicated below, to incorporate a particular sorbitol dosage. Also, the third post-partum control feed used in Pre/Post Trial #2 during weeks +5 through +8 following the early post-partum period incorporated a particular sorbitol dosage, as indicated below. Pre/Post Trial #1 and Pre/Post Trial #2 (a) differed from each other in the sorbitol dosage that was incorporated in the pre-partum control feed provided during the pre-partum period and (b) differed from each other in the sorbitol dosage that was incorporated in the first post-partum control feed provided during the early post-partum period.

In Examples One and Two, the pre-partum control feed had the composition set forth in Table 6 below and the pre-partum control feed had the nutrient composition set forth in Table 7 below:

TABLE 6

Ingredient Composition of Pre-Partum Control Feed

| Component | Weight Percent (As-Is Basis)* | Weight Percent (Dry Basis)** |
|---|---|---|
| Corn Silage (38% DM) | 60.00 | 38.66 |
| Concentrate*** | 24.00 | 36.66 |
| Grass Hay | 16.00 | 24.68 |

*Based on Total (As-Is) Weight of Pre-Partum Control Feed
**Based on Total Dry Matter Weight of Pre-Partum Control Feed
***TRANSCOW ® Complete 20 Pre-Fresh ration available from Land O'Lakes Farmland Feed, LLC.

TABLE 7

Nutrient Composition of Pre-Partum Control Feed

| Component | Value |
|---|---|
| Moisture (as is basis) | 41.0 wt. %* |
| Net Energy for Lactation | 0.724 Mc/lb |
| Crude Protein | 14.7 wt. %** |
| Non-Fiber Carbohydrate (NFC) | 37.3 wt. %** |
| Soluble Acid Detergent Fiber (ADF) | 23.0 wt. %*( |
| Soluble Neutral Detergent Fiber (NDF) | 38.3 wt. %** |
| Soluble Neutral Detergent Fiber (NDF) from Forage | 26.0 wt. %** |
| Forage | 63.4 wt. %** |
| Crude Fat | 2.6 wt. %** |
| Calcium | 1.0 wt. %** |

TABLE 7-continued

Nutrient Composition of Pre-Partum Control Feed

| Component | Value |
|---|---|
| Phosphorous | 0.37 wt. %** |
| Magnesium | 0.47 wt. %** |
| Potassium | 1.1 wt. %** |

*Based on Total (As-Is) Weight of Pre-Partum Control Feed
**Based on Total Dry Matter Weight of Pre-Partum Control Feed In Examples One and Two, the first post-partum control feed employed during the early post-partum period (week +1 through week +4) had the composition set forth in Table 8 below, the feed concentrate that was included in the first post-partum control feed had the composition set forth in Table 9 below, and the first post-partum control feed had the nutrient composition set forth in Table 10 below:

TABLE 8

Ingredient Composition of First Post-Partum Control Feed

| Component | Weight Percent (As-Is Basis)* | Weight Percent (Dry Basis)** |
|---|---|---|
| Corn Silage (32% DM) | 35.76 | 21.51 |
| Haylage (31% DM) | 26.49 | 15.43 |
| Alfalfa Hay (160 FRV) | 6.62 | 10.71 |
| Grass Hay | 3.97 | 6.42 |
| Concentrate | 27.16 | 45.93 |

*Based on Total (As-Is) Weight of First Post-Partum Control Feed
**Based on Total Dry Matter Weight of First Post-Partum Control Feed

TABLE 9

Ingredient Composition of Feed Concentrate of First Post-Partum Control Feed

| Component | Weight Percent (As-Is Basis)* |
|---|---|
| Soybean Hulls | 8.19 |
| Molasses | 0.63 |
| Soybean Meal (48 wt % true protein) | 13.65 |
| Ground Corn & Shelled Corn | 36.57 |
| Dried Distiller's Grain with Solubles | 12.14 |
| Wheat Midds | 5.56 |
| Whole Cottonseed | 10.19 |
| SUREPRO ® Rumen Bypass Protein | 4.39 |
| MEGALAC ® Rumen Bypass Fat | 0.73 |
| Choice White Grease | 1.12 |
| Vitamins & Minerals | 6.83 |

*Based on Total (As-Is) Weight of Feed Concentrate of First Post-Partum Control Feed

TABLE 10

Nutrient Composition of First Post-Partum Control Feed

| Component | Value |
|---|---|
| Moisture (as is basis) | 46.8 wt. %* |
| Net Energy for Lactation | 31.011 Mc/lb |
| Crude Protein | 18.6 wt. %*** |
| Undegradeable Protein | 33.5 wt. %** |
| Degradable Protein | 66.4 wt. %** |
| Soluble Protein | 34.8 wt. %** |
| Urea | 0.06 wt. %*** |
| Non-Fiber Carbohydrate (NFC) | 36.1 wt. %*** |
| Soluble Acid Detergent Fiber (ADF) | 20.6 wt. %*** |
| Soluble Neutral Detergent Fiber (NDF) | 30.8 wt. %*** |
| Soluble Neutral Detergent Fiber (NDF) from Forage | 20.6 wt. %*** |
| Forage | 54.1 wt. %*** |
| Crude Fat | 5.1 wt. %*** |

TABLE 10-continued

Nutrient Composition of First Post-Partum Control Feed

| Component | Value |
| --- | --- |
| Calcium | 0.99 wt. %*** |
| Phosphorous | 0.42 wt. %*** |
| Magnesium | 0.32 wt. %*** |
| Potassium | 1.6 wt. %*** |

*Based on Total (As-Is) Weight of First Post-Partum Control Feed
**Based on Total Weight of Crude Protein in First Post-Partum Control Feed
***Based on Total Dry Matter Weight of First Post-Partum Control Feed In Example One, the second post-partum control feed employed from week +5 through week +8 had the composition set forth in Table 11 below. In Example Two, the third post-partum control feed employed from week +5 through week +8 had the composition set forth in Table 11, with the exception that the third post-partum control feed was subsequently modified to incorporate sugar alcohol, as later indicated herein.

TABLE 11

Ingredient Composition of Second and Third+ Post-Partum Control Feeds

| COMPONENTS | WEIGHT PERCENT (DRY BASIS)* |
| --- | --- |
| alfalfa haylage | 13 |
| alfalfa hay | 13 |
| corn silage | 26 |
| corn, cracked | 18.8 |
| PEAK PLUS ® 37 formula feed | 8 |
| FRESH TRAN PLUS ® formula feed | 10.4 |
| CONDITION PLUS ® formula feed | 4.5 |
| QLF ® 4-19 formula feed | 4.7 |
| other minor ingredients | 1.6 |

*Based on Total Dry Matter Weight of Second Post-Partum Control Feed
+The third post-partum control feed was subsequently modified, as indicated subsequently herein, to incorporate sugar alcohol The ingredient list for the second post-partum control feed of Table 11 and for the third post-partum control feed of (does not reflect modification to incorporate sugar alcohol) of Table 11 is detailed further in Table 12 below:

TABLE 12

Ingredient Composition of Second and Third+ Post-Partum Control Feeds

| COMPONENT | WEIGHT PERCENT (DRY BASIS)*** |
| --- | --- |
| alfalfa haylage | 13 |
| alfalfa hay | 13 |
| corn silage | 26 |
| cracked corn | 18.8 |
| QLF ® 4-19 formula feed | 4.7 |
| whole cotton seed | 4.2* |
| 48 wt. % protein soybean meal | 7.8* |
| wheat midds | 1.9* |
| soy hulls | 1.1* |
| SOYPASS ™ protein-modified soybean meal | 2.6* |
| dried distiller's grain with solubles | 1.9* |

TABLE 12-continued

Ingredient Composition of Second and Third+ Post-Partum Control Feeds

| COMPONENT | WEIGHT PERCENT (DRY BASIS)*** |
| --- | --- |
| molasses | 0.5* |
| MEGALAC ® rumen-bypass fat base | 0.9* |
| other minor ingredients | 3.7** |

*derived from PEAK PLUS ® 37 formula feed, FRESH TRAN PLUS ® formula feed, and/or CONDITION PLUS ® formula feed
**derived from PEAK PLUS ® 37 formula feed, FRESH TRAN PLUS ® formula feed, and/or CONDITION PLUS ® formula feed and from other minor ingredients listed in Table 11
***Based on Total Dry Matter Weight of Second Post-Partum Control Feed
+The third post-partum control feed was subsequently modified, as indicated subsequently herein, to incorporate sugar alcohol The second post-partum control feed and the third post-partum control feed (does not reflect modification to incorporate sugar alcohol) had the nutrient composition set forth in Table 13 below.

TABLE 13

Nutrient Composition of Second and Third+ Post-Partum Control Feeds

| NUTRIENT | WEIGHT PERCENT (DRY BASIS)* |
| --- | --- |
| crude protein | 18.1 |
| acid detergent soluble fiber (ADF) | 18.9 |
| neutral detergent soluble fiber (NDF) | 27.5 |
| fat | 6 |
| calcium | 1.05 |
| phosphorous | 0.52 |

*Based on Total Dry Matter Weight of Second Post-Partum Control Feed
+The third post-partum control feed was subsequently modified, as indicated subsequently herein, to incorporate sugar alcohol In Control Trial #2, sorbitol syrup was incorporated by blending into the third post-partum control feed in a ratio of sorbitol to the third post-partum control feed that was designed to provide the female ruminants of Control Trial #2 with about 100 grams of sorbitol per day from week +5 through week +8 of each control trial, based on historical feed intake data for the female ruminants of Control Trial #2. Again, the second post-partum control feed used in Control Trial #1 during weeks +5 through +8 following the early post-partum period did not include any sugar alcohol.

In both Pre-Partum Trials, sorbitol syrup was blended with the pre-partum control feed in a ratio of sorbitol to the pre-partum control feed that was designed to provide the female ruminants of both Pre-Partum Trials with about 75 grams of sorbitol per day during the pre-partum period (weeks −3 through −1), based on historical feed intake data for the female ruminants of the two Pre-Partum Trials. No sugar alcohol was included in or provided along with the first post-partum control feed fed to the female ruminants of either Pre-Partum Trial during the early post-partum period. In Pre-Partum Trial #2, sorbitol syrup was incorporated by blending into the third post-partum control feed in a ratio of sorbitol to the third post-partum control feed that was designed to provide the female ruminants of Pre-Partum Trial #2 with about 100 grams of sorbitol per day from week +5 through week +8 of each control trial, based on historical feed intake data for the female ruminants of Pre-Partum Trial #2. Again, the second post-partum control feed used in Pre-Partum Trial #1 during weeks +5 through +8 following the early post-partum period did not include any sugar alcohol.

In Pre/Post Trial #1, sorbitol syrup was blended with the pre-partum control feed in a ratio of sorbitol to the pre-partum control feed that was designed to provide the female ruminants of Pre/Post Trial #1 with about 150 grams of sorbitol per day during the pre-partum period (weeks −3 through −1), based on historical feed intake data for the female ruminants of Pre/Post Trial #1. In Pre/Post Trial #1, sorbitol syrup was blended with the first post-partum control feed in a ratio of sorbitol to the first post-partum control feed that was designed to provide the female ruminants of Pre/Post Trial #1 with about 125 grams of sorbitol per day during the early post-partum period (weeks +1 through +4), based on historical feed intake data for the female ruminants of Pre/Post Trial #1. In Pre/Post Trial #1, sorbitol syrup was blended with the third post-partum control feed in a ratio of sorbitol to the third post-partum control feed that was designed to provide the female ruminants of Pre/Post Trial #1 with about 100 grams of sorbitol per day from week +5 through week +8 of Pre/Post Trial #1, based on historical feed intake data for the female ruminants of Pre/Post Trial #1.

In Pre/Post Trial #2, sorbitol syrup was blended with the pre-partum control feed in a ratio of sorbitol to the pre-partum control feed that was designed to provide the female ruminants of Pre/Post Trial #2 with about 75 grams of sorbitol per day during the pre-partum period (weeks −3 through −1), based on historical feed intake data for the female ruminants of Pre/Post Trial #2. In Pre/Post Trial #2, sorbitol syrup was blended with the first post-partum control feed in a ratio of sorbitol to the first post-partum control feed that was designed to provide the female ruminants of Pre/Post Trial #2 with about 75 grams of sorbitol per day during the early post-partum period (weeks +1 through +4), based on historical feed intake data for the female ruminants of Pre/Post Trial #2. In Pre/Post Trial #2, sorbitol syrup was blended with the third post-partum control feed in a ratio of sorbitol to the third post-partum control feed that was designed to provide the female ruminants of Pre/Post Trial #2 with about 100 grams of sorbitol per day from week +5 through week +8 of Pre/Post Trial #2, based on historical feed intake data for the female ruminants of Pre/Post Trial #2.

During the pre-partum period, for all cows utilized in Example One or Example Two, the pre-partum control feed, as modified to include any sorbitol indicated above for the different trials, was placed in the feeding troughs of the different cows participating in the different trials once daily in the morning. Thereafter, these different pre-partum feeds (the pre-partum control feed, including any incorporated sorbitol dosage of a particular trial during the pre-partum period) of the different trials were lightly stirred, separately and individually, in front of the cows of the different trials three times per day during the pre-partum period to encourage additional feed ingestion by the cows.

Leftover rations from the previous day's feeding were collected and weighed from each feeding trough during the pre-partum period, prior to feeding the test cows on a subsequent day. The cows of the different trials received a sufficient amount of the pre-partum to ensure at least about ten weight percent of the pre-partum feeds of the different trials remained in the feeding troughs of each trial each day of the pre-partum period, based on the amount of the different pre-partum feeds of the different trials provided at the beginning of each day. Feed refusals were measured daily during the pre-partum period, and water was supplied ad libitum.

During the early post-partum period, for all cows utilized in Example One or Example Two, the first post-partum control feed, as modified to include any sorbitol indicated above for the different trials, was placed in the feeding troughs of the different cows participating in the different trials once daily in the morning. Thereafter, these first post-partum feeds (the first post-partum control feed, including any incorporated sorbitol dosage of a particular trial during the early post-partum period) of the different trials were lightly stirred, separately and individually, in front of the cows of the different trials three times per day during the early postpartum period to encourage additional feed ingestion by the cows.

Leftover rations from the previous day's feeding were collected and weighed from each feeding trough during the early post-partum period, prior to feeding the test cows on a subsequent day. The cows of the different trials received a sufficient amount of the first post-partum feed to ensure at least about ten weight percent of the first post-partum feeds of the different trials remained in the feeding troughs of each trial each day of the early post-partum period, based on the amount of the different first post-partum feeds of the different trials provided at the beginning of each day. Feed refusals were measured daily during the early post-partum period, and water was supplied ad libitum.

During weeks +5 through +8 following the early post-partum period, for all cows utilized in Example One, the second postpartum control feed (which did not include any added sugar alcohol as explained elsewhere herein) was placed in the feeding troughs of the different cows participating in the different trials once daily in the morning. Thereafter, the second post-partum control feed were lightly stirred, separately and individually, in front of the cows of the different trials three times per day during the weeks +5 through +8 to encourage additional feed ingestion by the cows.

Leftover rations from the previous day's feeding were collected and weighed from each feeding trough during weeks +5 through +8, prior to feeding the test cows on a subsequent day. The cows of the different trials received a sufficient amount of the second postpartum control feed to ensure at least about ten weight percent of the second postpartum control feed of the different trials remained in the feeding troughs of each trial each day during weeks +5 through +8, based on the amount of the second post-partum control feed of the different trials provided at the beginning of each day. Feed refusals were measured daily during weeks +5 through +8, and water was supplied ad libitum.

During weeks +5 through +8 following the early postpartum period, for all cows utilized in Example Two, the third post-partum control feed, as modified to include sorbitol as indicated above for the different trials of Example Two, was placed in the feeding troughs of the different cows participating in the different trials once daily in the morning. Thereafter, these third post-partum feeds (the third post-partum control feed, including any incorporated sorbitol dosage of a particular trial during weeks +5 through +8) of the different trials were lightly stirred, separately and individually, in front of the cows of the different trials three times per day during the weeks +5 through +8 to encourage additional feed ingestion by the cows.

Leftover rations from the previous day's feeding were collected and weighed from each feeding trough during weeks +5 through +8, prior to feeding the test cows on a subsequent day. The cows of the different trials received a sufficient amount of the third post-partum feed to ensure at least about ten weight percent of the third postpartum feeds of the different trials remained in the feeding troughs of each trial each day during weeks +5 through +8, based on the amount of the different third post-partum feeds of the different trials provided at the beginning of each day. Feed refusals were measured daily during weeks +5 through +8, and water was supplied ad libitum.

Each cow of each of the six different trials (Control Trial #1, Control Trial #2, Pre-Partum Trial #1, Pre-Partum Trial #2, Pre/Post Trial #1, and Pre/Post Trial #2) received routine care and management consistent with appropriate recommendations in the *Guide for the Care and Use of Agricultural Animals in Agricultural Research and Teaching* (1st edition, March 1988). This care and management was provided throughout the pre-partum period, the early post-partum period, and the four week period (weeks +5 through +8) following the early post-partum period.

Each cow of each of the six different trials (Control Trial #1, Control Trial #2, Pre-Partum Trial #1, Pre-Partum Trial #2, Pre/Post Trial #1, and Pre/Post Trial #2) was milked three times daily and the weight of produced milk by each cow was recorded at each milking. The milk from each cow was sampled once per week (⅓ of the sample volume from each of the three milkings occurring on the weekly milk sampling day) and was analyzed for true protein, total fat, lactose, and total solids, as detailed in the property determination and characterization techniques presented above. Additionally, samples of blood were periodically obtained from each cow during the four trials (Control Trial 2, Pre-Partum Trial #2, Pre/Post Trial #1, and Pre/Post Trial #2) encompassed in Example Two and were analyzed for non-esterified fatty acid (NEFA) content as detailed in the property determination and characterization techniques presented above. No NEFA analysis was conducted on the cows employed in Control Trial #1 or Pre-Partum Trial #1 that are the subject of Example One.

For the data underlying the mean data presented in Example One, statistical analysis was employed for comparing the results of feeding the female ruminants assigned to Control Trial #1 according to the feeding protocol of Control Trial #1 versus the results of feeding the female ruminants assigned to Pre-Partum Trial #1 according to the feeding protocol of Pre-Partum Trial #1. Likewise, for the data underlying the mean data presented in Example Two, statistical analysis was employed for comparing the results of feeding the female ruminants assigned to Control Trial #2 according to the feeding protocol of Control Trial #2; the results of feeding the female ruminants assigned to Pre-Partum Trial #2 according to the feeding protocol of Pre-Partum Trial #2, the results of feeding the female ruminants assigned to Pre/Post Trial #1 according to the feeding protocol of Pre/Post Trial #1, and the results of feeding the female ruminants assigned to Pre/Post Trial #2 according to the feeding protocol of Pre/Post Trial #2. For each individual trial, all data provided in Tables 14-27 below for that individual trial is based on individual data collected for each cow, then-present, as least square means of the data over all cows present in that individual trial at the time the individual data was recorded, unless otherwise indicated. The data provided in Tables 14-27 below are these least square means.

Data for parameters presented in Tables 14-27 was analyzed using the general linear model (GLM) statistical procedure of SAS™ statistical analysis software for a randomized complete block design that included both the feed regimen of the particular trial and the period (pre-partum period, early post-partum period, or period of weeks +5 through +8 following the early post-partum period) when the data was collected, in the model statement. The SAS™ statistical analysis software is available from SAS Institute, Inc. of Cary, N.C.

Additionally, the PDiff function of the GLM statistical procedure was used to characterize the mean data values by providing for comparisons between mean data values for the female ruminants subjected to the particular feeding protocols of the six different trials (Control Trial #1, Control Trial #2, Pre-Partum Trial #1, Pre-Partum Trial #2, Pre/Post Trial #1, and Pre/Post Trial #2) for particular test parameters or variables. The probability value P is a measure of the statistical probability that the differing parameter values derived from feeding female ruminants in differing ways may be explained solely by the difference between particular feeding protocols.

A P value of 0.05, as between data values for two particular trials, means five times out of 100 the results of the two particular trials under consideration may be explained by factors other than feeding protocols differences between the two particular trials under consideration. Likewise, a P value of 0.77, as between data values for two particular trials, means that 77 times out of 100, the difference between data values for the two particular trials may be explained by factors other than feeding protocols differences between the two particular trials under consideration. For purposes of comparing data in this document, P values of 0.10, or lower, are considered to be statistically significant. Thus, where a P value of 0.10 or less is returned for a particular variable, it is assumed the differing results are fully explained by feeding regimen differences between the two trials under consideration.

Example One

Example One includes Control Trial #1 and Pre-Partum Trial #1. Both primiparious cows and multiparious cows were included in Control Trial #1 and Pre-Partum Trial #1. Five primiparious cows and fifteen multiparious cows were included in Control Trial #1; likewise, five primiparious cows and fifteen multiparious cows were included in Pre-Partum Trial #1. All cows included in Control Trial #1 and Pre-Partum Trial #1 were Holsteins.

All of the multiparious cows included in Example One were blocked by parity and by milk production, based on the level of milk production over a select period by the individual multiparious cows during the lactation period of the individual multiparious cows that ended most recently prior to participation in the trials of Example One. After being blocked by parity and milk production, the multiparious cows were randomly allotted to either Control Trial #1 or Pre-Partum Trial #1. The primiparious cows included in Control Trial #1 and Pre-Partum Trial #1 were blocked by body weight prior to participation in the trials of Example One. After being blocked by body weight, the primiparious cows were randomly allotted to either Control Trial #1 or Pre-Partum Trial #1.

The means of various parameters derived from the raw data of Pre-Partum Trial #1 and Control Trial #1 are provided in Table 14. The means provided in Table 14 are based solely on data from primiparious cows that were included in Pre-Partum Trial #1 and Control Trial #1.

TABLE 14

| Variable | Weeks | Control Trial #1 | Pre-Partum Trial #1 | SEM | P |
|---|---|---|---|---|---|
| Dry Matter Feed Intake (lbs/day) | −3 through −1 | 18.1 | 17.8 | 1.32 | |
| | +1 through +8 | 31.7 | 34.2 | 0.98 | 0.01 |
| Milk Production (As Is Basis - lbs/day) | +1 through +8 | 71.7 | 71.7 | 1.71 | |
| Milk Production (4.0% fat basis - lbs/day) | +1 through +8 | 73.7 | 79.3 | 2.62 | |

TABLE 14-continued

| Variable | Weeks | Control Trial #1 | Pre-Partum Trial #1 | SEM | P |
|---|---|---|---|---|---|
| Fat in Produced Milk (wt %) | +1 through +8 | 3.76 | 4.2 | 0.13 | 0.01 |
| True Protein in Produced Milk (wt %) | +1 through +8 | 2.70 | 2.9 | 0.043 | 0.001 |
| Lactose in Produced Milk (wt %) | +1 through +8 | 4.74 | 4.98 | 0.029 | 0.0001 |
| Total Solids in Produced Milk (wt %) | +1 through +8 | 12.1 | 13.0 | 0.14 | 0.01 |

The data presented in Table 14 illustrates the pre-partum feeding of sorbitol according to Pre-Partum Trial #1 increased dry matter feed intake of the primiparious cows by +7.9% (P=0.01) versus the primiparious cows of Control Trial #1 during the period starting at the beginning of week +1 and extending through the end of week +8; this was accompanied by a 7.6% increase in production of 4% fat-corrected milk by the primiparious cows of Pre-Partum Trial #1 versus the primiparious cows of Control Trial #1 during the period starting at the beginning of week +1 and extending through the end of week +8. A plot of the daily dry matter feed intake per cow is provided in FIG. 1 for the primiparious cows of Pre-Partum Trial #1 versus the primiparious cows of Control Trial #1 is presented, by week, extending from the beginning of the pre-partum period (weeks −3 through −1), through the early post-partum period (weeks +1 through +4), and through week +8.

Additionally, the pre-partum feeding of sorbitol according to Pre-Partum Trial #1 increased the fat concentration in the produced milk by 11.7% (P=0.01), increased the true protein concentration in the produced milk by 7.4% (P=0.001), increased the lactose concentration in the produced milk by 5.1% (P=0.0001), and increased the total solids concentration in the produced milk by 7.4% (P=0.0) for the primiparious cows of Pre-Partum Trial #1 versus the primiparious cows of Control Trial #1, as determined over the period starting at the beginning of week +1 and extending through the end of week +8. Collectively, this data of Table 14 illustrates the pre-partum feeding of sorbitol according to Pre-Partum Trial #1 significantly improved the post-partum feed intake, 4% fat-corrected milk production, and milk component concentrations of the primiparious cows of Pre-Partum Trial #1 versus the primiparious cows of Control Trial #1.

Additional means of various parameters derived from the raw data of Pre-Partum Trial #1 and Control Trial #1 are provided in Table 15. The means provided in Table 15 are based solely on data from multiparious cows that were included in Pre-Partum Trial #1 and Control Trial #1.

The data presented in Table 15 illustrates the pre-partum feeding of sorbitol according to Pre-Partum Trial #1 increased dry matter feed intake of the multiparious cows by +9.6% (P=0.0001) and increased milk production by 9.2% (P=0.0001) by the multiparious cows of Pre-Partum Trial #1 versus the multiparious cows of Control Trial #1 during the period starting at the beginning of week +1 and extending through the end of week +8. This large and significant milk production increase was accompanied by a large and significant 4% fat-corrected milk production increase of 12.4% (P=0.09) by the multiparious cows of Pre-Partum Trial #1 versus the multiparious cows of Control Trial #1 during the period starting at the beginning of week +1 and extending through the end of week +8.

Figure 2:
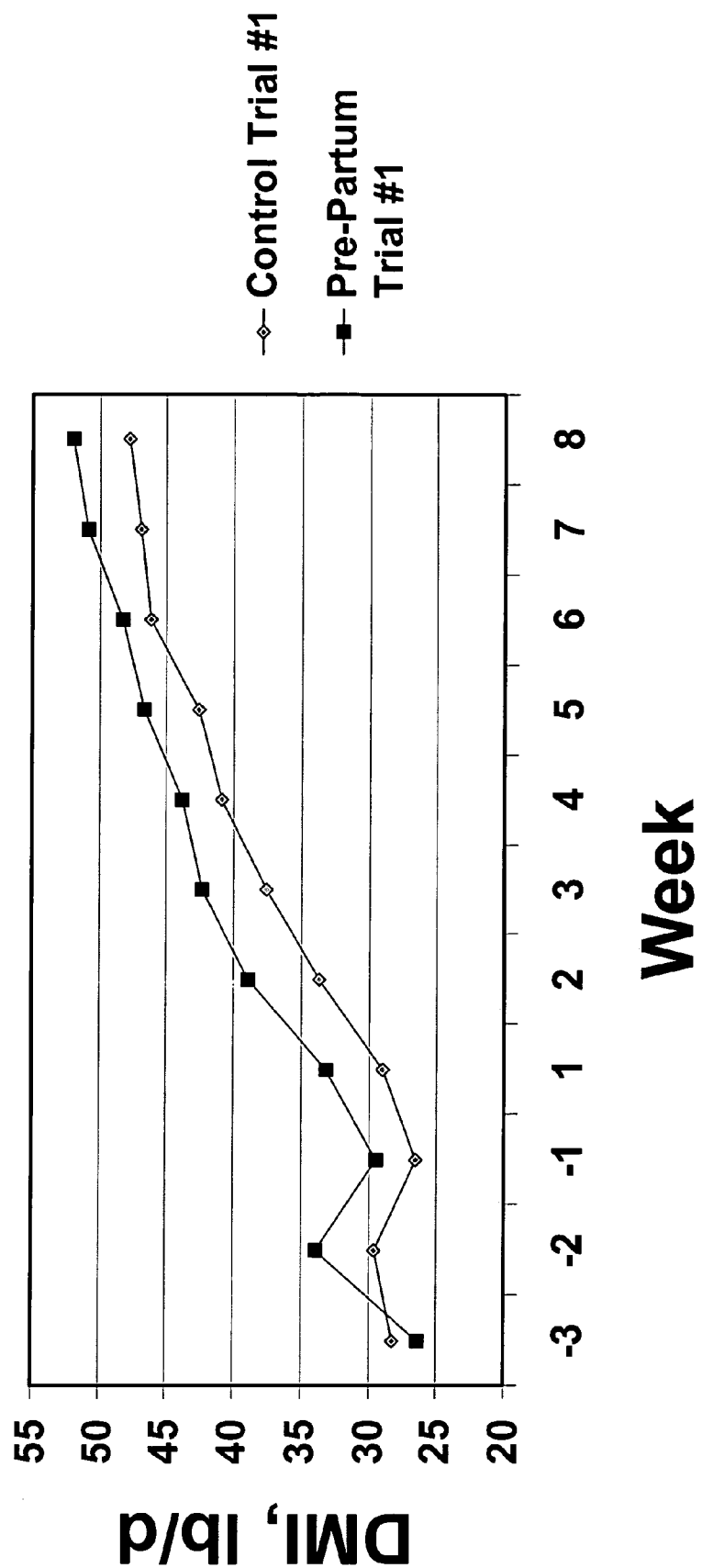
FIG. 2 is a graph depicting differences in dry matter intake in multiparous cows that are fed the control ration versus multiparous cows that are fed the control ration, along with sugar alcohol during a pre-partum period, in accordance with the present invention.
Figure 3:
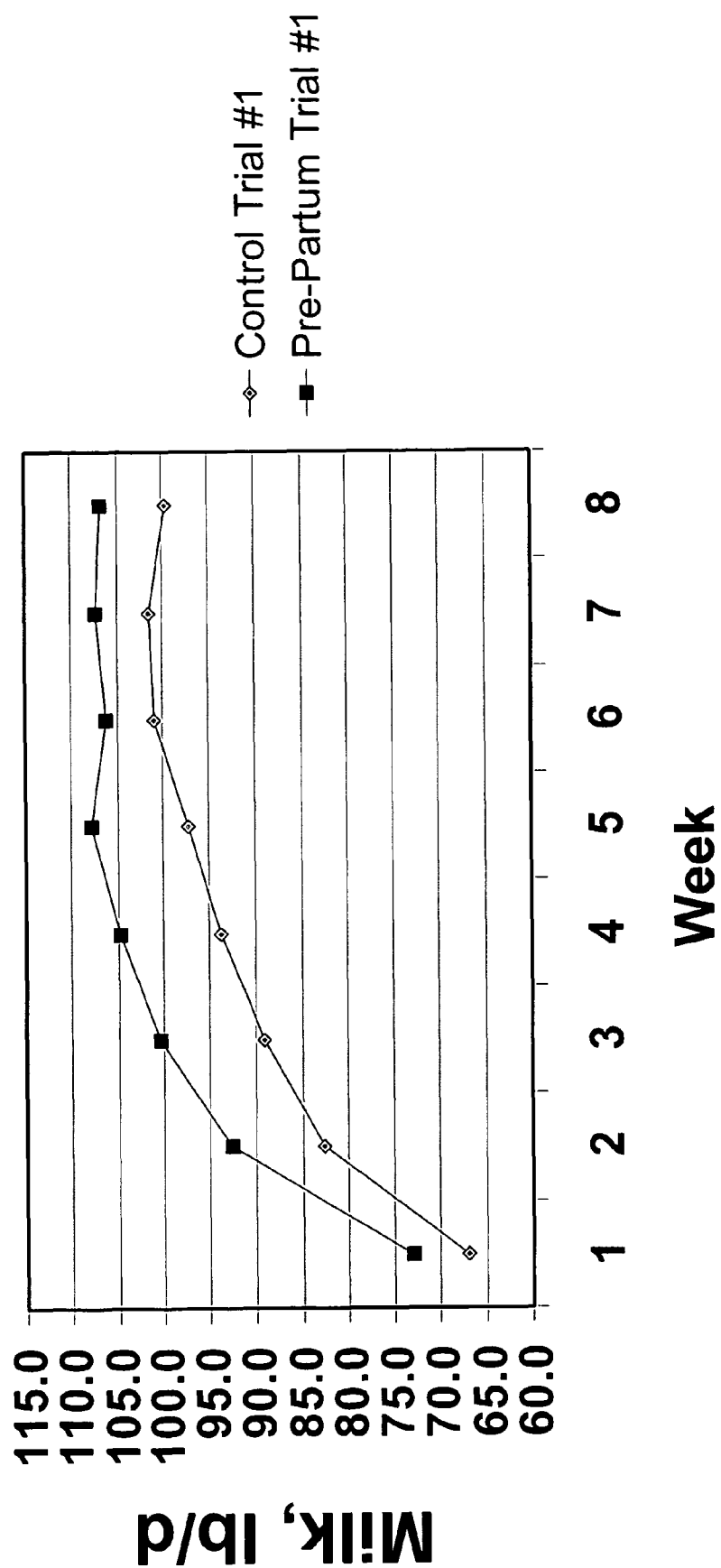
FIG. 3 is a graph depicting differences in the amount of milk production by multiparous cows fed the control ration versus multiparous cows fed the control ration, along with sugar alcohol during the pre-partum period, in accordance with the present invention.

A plot of the daily dry matter feed intake per cow is presented in FIG. 2 for the multiparious cows of Pre-Partum Trial #1 versus the multiparious cows of Control Trial #1, by week, extending from the beginning of the pre-partum period (weeks −3 through −1), through the early post-partum period (weeks +1 through +4), and through week +8. Also, FIG. 3 is a plot of the daily milk production weights for the multiparious cows of Pre-Partum Trial #1 versus the multiparious cows of Control Trial #1, by week, extending from the beginning of the early post-partum period (weeks +1 through +4) through week +8.

Example Two

Example Two includes Control Trial #2, Pre-Partum Trial #2, Pre/Post Trial #1, and Pre/Post Trial #2. Only multiparious, Holstein cows were included in Control Trial #2, Pre-Partum Trial #1, Pre/Post Trial #1, and Pre/Post Trial #2. Eighteen multiparious cows were included in both Control Trial #2 and Pre-Partum Trial #2, while sixteen multiparious cows were included in Pre/Post Trial #1 and seventeen multiparious cows were included in Pre/Post Trial #2.

All of the cows included in Example Two were blocked by parity and by milk production, based on the level of milk production over a select period by the individual cows during the lactation period of the individual multiparious cows that ended most recently prior to participation in the trials of Example Two. After being blocked by parity and milk production, the multiparious cows were randomly allotted to either Control Trial #2, Pre-Partum Trial #2, Pre/Post Trial #1, or Pre/Post Trial #2.

The data means presented in Table 16 below were covariately adjusted using only dry matter feed consumption rates (weight basis) of the cows present during the trials detailed in Table 16. On the other hand, the data means presented in Table 17 for Milk Production (As Is Basis) and for Milk

TABLE 15

| Variable | Weeks | Control Trial #1 | Pre-Partum Trial #1 | SEM | P |
|---|---|---|---|---|---|
| Dry Matter Feed Intake (lbs/day) | −3 through −1 | 28.1 | 29.9 | 0.79 | |
| | +1 through +8 | 40.6 | 44.5 | 0.60 | 0.0001 |
| Milk Production (As Is Basis - lbs/day) | +1 through +8 | 91.5 | 99.9 | 1.04 | 0.0001 |
| Milk Production (4.0% fat basis - lbs/day) | +1 through +8 | 87.7 | 98.6 | 1.59 | 0.09 |
| Fat in Produced Milk (wt %) | +1 through +8 | 3.35 | 3.50 | 0.081 | |
| True Protein in Produced Milk (wt %) | +1 through +8 | 2.81 | 2.82 | 0.026 | |
| Lactose in Produced Milk (wt %) | +1 through +8 | 4.75 | 4.77 | 0.017 | |
| Total Solids in Produced Milk (wt %) | +1 through +8 | 11.8$^b$ | 12.0$^{ab}$ | 0.086 | |

Production (4% Fat Basis) were covariately adjusted using only pre-trial milk production rates (weight basis) of the cows present during the trials detailed in Table 17. Covariate adjustment entails the creation of a statistical adjustment factor, considering the values of the selected covariate variable(s) for each individual cow prior to any feeding according to any trial of Example Two, that yields a standard base line using the covariate variable(s) employed for the test cows, and thereby statistically accounts for any variations in the covariate variable(s) employed, as between the different cows of the subject trials, prior to feeding in accordance with any of the different trials of Example Two.

In Table 16 through Table 21 that follow below, means of various parameters for multiparious cows that were determined in the course of Pre-Partum Trial #2, Pre/Post Trial #1, Pre/Post Trial #2, and Control Trial #2 are provided. In Tables 16 through 21, where a value appears in a particular row for P(01), the P(01) value that is provided is a measure of the statistical probability that differences between the mean data provided in that row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2. In Tables 16 through 21, if a P(01) value is presented in a particular row, another test for significance, namely the Least Significant Squares Difference (also referred to herein as "LSD") test, was conducted for the data of that row to detect which of the six possible different pairs of data in that particular row (i.e., (a) Pre-Partum Trial #2 versus Control Trial #2, (b) Pre/Post Trial #1 versus Control Trial #2, (c) Pre/Post Trial #3, (d) Pre-Partum Trial #2 vs. Pre/Post Trial #1, (e) Pre-Partum Trial #2 vs. Pre/Post Trial #2, and (f) Pre/Post Trial #1 vs. Pre/Post Trial #2) are significantly different (P<0.05) from each other. If the Least Squares Difference Test for data in a row showing a P(01) value returned a result showing any of the six possible pairs of data differed from each other at P<0.05, this pair (or these pairs) of data are indicated by differing superscript letters for each data of the pair (or pairs) in Tables 16-21.

Also, in Tables 16 through 21, where a value appears in a particular row for P(02), the P(02) value that is provided is a measure of the statistical probability that differences between the average of the three means provided in that row for Pre-Partum Trial #2, Pre/Post Trial #1, and Pre/Post Trial #2 versus the mean data provided in that row for Control Trial #2 may be explained solely by the difference between the feeding protocol(s) of Pre-Partum Trial #2, Pre/Post Trial #1, and/or Pre/Post Trial #2 versus the feeding protocol of Control Trial #2. Additionally, in Tables 16-21, where a value appears in a particular row for P(03), the P(03) value that is provided is a measure of the statistical probability that differences between the means provided in that row for Pre-Partum Trial #2 versus the mean data provided in that row for Control Trial #2 may be explained solely by the difference between the feeding protocol of Pre-Partum Trial #2 versus the feeding protocol of Control Trial #2. Finally, in Tables 16-21, where a value appears in a particular row for P(04), the P(04) value that is provided is a measure of the statistical probability that differences between the means provided in that row for Pre/Post Trial #1 versus the mean data provided in that row for Pre/Post Trial #2 may be explained solely by the difference between the feeding protocol of Pre/Post Trial #1 versus the feeding protocol of Pre/Post Trial #2.

In Table 16, means of dry matter feed intake data for multiparious cows derived from the raw data of Pre-Partum Trial #2, Pre/Post Trial #1, Pre/Post Trial #2, and Control Trial #2 are provided. Again, the data means presented in Table 16 above were covariately adjusted using only dry matter feed consumption rates (weight basis) of the cows present during the trials detailed in Table 16.

TABLE 16

| | | Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|---|
| Dry | Pre-partum | −3 | 31.9 | 30.9 | 29.6 | 31.9 | 1.12 | | | | 0.15 |
| Matter | | −2 | 36.2 | 33.5 | 34.6 | 36.3 | 1.29 | | | 0.15 | |
| Intake | | −1 | 34.0 | 30.7 | 33.3 | 32.3 | 1.55 | | | 0.15 | |
| (lbs/day) | | −3 through −1 | 34.2 | 31.8 | 32.6 | 33.2 | 1.02 | | 0.17 | 0.10 | |
| | Post-partum | +1 | 34.3 | 32.7 | 36.6 | 33.1 | 1.51 | | | | 0.10 |
| | | +2 | 42.5 | 42.5 | 45.3 | 41.2 | 1.68 | | | | 0.10 |
| | | +3 | 45.5 | 46.2 | 48.5 | 45.3 | 1.78 | | | | |
| | | +4 | 49.3 | 50.1 | 51.2 | 49.8 | 1.78 | | | | |
| | | +5 | 51.1 | 52.4 | 53.9 | 53.6 | 1.56 | | | | |
| | | +6 | 52.7 | 53.9 | 53.7 | 54.2 | 1.65 | | | | |
| | | +7 | 53.6 | 56.1 | 54.5 | 53.3 | 1.65 | | | | |
| | | +8 | 54.2 | 53.8 | 57.1 | 55.0 | 1.87 | | | | |
| | | +1 through +4 | 42.9 | 42.9 | 45.4 | 42.2 | 1.45 | | | | 0.12 |
| | | +5 through +8 | 52.9 | 54.2 | 54.9 | 54.1 | 1.55 | | | | |
| | | +1 through +8 | 47.9 | 48.4 | 50.1 | 48.2 | 1.39 | | | | |
| Change in Dry Matter | | −2 versus −1 | −2.30 | −2.88 | −1.39 | −3.91 | 1.14 | | | | 0.13 |
| Feed Intake (lbs/day) | | +1 versus −1 | 0.35 | 1.97 | 3.37 | 0.72 | 1.51 | | | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2.
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2
$a, b$ For any row where a P(01) value appears and superscript letters are provided for the data of that row, data without any common superscript letter differ from each other at a probability P of <0.05

Data presented in Table 16 illustrates sorbitol feeding according to the present invention decreased the dry matter feed intake (average of means of Pre-Partum Trial #2, Pre/Post Trial #1, and Pre/Post Trial #2) by the multiparious ruminants by 4.9% (P=0.17) versus the dry matter feed intake of the multiparious cows of Control Trial #2, as measured over the pre-partum period of Example Two. Data presented in Table 16 further illustrates feeding of sorbitol according to the present invention decreased the dry matter feed intake by the multiparious ruminants of Pre-Partum Trial #2 by 7.0% (P=0.10) versus the dry matter feed intake of the multiparious cows of Control Trial #2, as measured over the pre-partum period of Example Two.

Data presented in Table 16 further indicates sorbitol feeding at a higher daily dosage during the pre-partum period and the early post-partum period according to Pre/Post Trial #1, as compared to the lower daily sorbitol dosage during the pre-partum period and the early post-partum period according to Pre/Post Trial #2, had a greater effect on feed intake of the multiparious ruminants as evidenced by a 7.6% (P=0.12) greater daily rate of dry matter feed intake for the ruminants of Pre/Post Trial #1 versus the ruminants of Pre/Post Trial #2, as measured over the early post-partum period of Example Two.

In Table 17, means of daily milk production, daily 4% fat-corrected milk production, and fat concentration in produced milk for multiparious cows derived from the raw data of Pre-Partum Trial #2, Pre/Post Trial #1, Pre/Post Trial #2, and Control Trial #2 are provided. Again, the data means presented in Table 17 for Milk Production (As Is Basis) and for Milk Production (4% Fat Basis) were covariately adjusted using pre-trial milk production rates (weight basis) of the cows present during the trials detailed in Table 17.

nants by 7.9% (P=0.09) (average of means of Pre-Partum Trial #2, Pre/Post Trial #1, and Pre/Post Trial #2) versus the fat concentration in milk produced by the multiparious ruminants of Control Trial #2, as measured over weeks +5 through +8 following the early post-partum period of Example Two. Furthermore, data presented in Table 17 illustrates sorbitol feeding according to the present invention significantly increased the fat concentration in milk produced by the multiparious ruminants by 4.7% (P=0.19) (average of means of Pre-Partum Trial #2, Pre/Post Trial #1, and Pre/Post Trial #2) versus the fat concentration in milk produced by the multiparious ruminants of Control Trial #2, as measured from the beginning of the early post-partum period through week +8 of Example Two.

Other data presented in Table 17 further illustrates sorbitol feeding according to the present invention increased production of 4% fat-corrected milk. For example, production of 4% fat-corrected milk by the multiparious ruminants of Pre/Post Trial #2 was 12.1% (P<0.05) greater than production of 4% fat-corrected milk by the multiparious ruminants of Control Trial #2 during week +5. Also, production of 4% fat-corrected milk by the multiparious ruminants of Pre/Post Trial #1 was 13.2% (P<0.05) greater than production of 4% fat-corrected milk by the multiparious ruminants of Control Trial #2 during week +8.

TABLE 17

| | Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|
| Milk Production (As Is Basis - lbs/day) | +1 | 67.3 | 62.8 | 67.9 | 66.4 | 3.12 | | | | |
| | +2 | 94.3 | 92.6 | 93.8 | 92.8 | 2.90 | | | | |
| | +3 | 103 | 102 | 104 | 102 | 3.62 | | | | |
| | +4 | 108 | 111 | 109 | 108 | 3.95 | | | | |
| | +5 | 111 | 115 | 113 | 113 | 3.82 | | | | |
| | +6 | 113 | 115 | 113 | 113 | 3.72 | | | | |
| | +7 | 115 | 115 | 112 | 110 | 3.35 | | | | |
| | +8 | 114 | 111 | 114 | 108 | 3.94 | | | | |
| | +1 through +4 | 93.4 | 92.0 | 93.6 | 91.7 | 2.97 | | | | |
| | +5 through +8 | 113 | 115 | 113 | 111 | 3.57 | | | | |
| | +1 through +8 | 103 | 103 | 103 | 102 | 3.06 | | | | |
| Milk Production (4.0% fat basis - lbs/day) | +1 | $79.4^{ab}$ | $71.1^{a}$ | $82.1^{ab}$ | $88.6^{b}$ | 4.80 | 0.08 | | | |
| | +2 | 99 | 100 | 100 | 103 | 4.11 | | | | |
| | +3 | 105 | 104 | 107 | 106 | 4.49 | | | | |
| | +4 | 103 | 101 | 109 | 105 | 3.48 | | | | |
| | +5 | $99^{a}$ | $104^{ab}$ | $108^{ab}$ | $111^{b}$ | 4.18 | | 0.08 | | |
| | +6 | 97 | 102 | 109 | 104 | 4.12 | | 0.11 | | |
| | +7 | 100 | 102 | 103 | 101 | 3.66 | | | | |
| | +8 | $96.0^{a}$ | $99.5^{ab}$ | $108.7^{b}$ | $94.4^{a}$ | 4.36 | 0.09 | | | 0.02 |
| | +1 through +4 | 97.3 | 94.4 | 99.5 | 100.6 | 3.29 | | | | |
| | +5 through +8 | 98 | 102 | 107 | 102 | 3.43 | 0.15 | | | |
| | +1 through +8 | 98 | 98 | 103 | 101 | 3.08 | | | | |
| Fat Content of Produced Milk (weight %) | +1 | $5.32^{ab}$ | $4.91^{a}$ | $5.49^{ab}$ | $6.23^{b}$ | 0.340 | 0.05 | | | 0.12 |
| | +2 | 4.39 | 4.50 | 4.41 | 4.73 | 0.212 | | | | |
| | +3 | 4.22 | 4.09 | 4.22 | 4.21 | 0.233 | | | | |
| | +4 | $3.77^{ab}$ | $3.41^{a}$ | $4.01^{b}$ | $3.87^{b}$ | 0.146 | 0.03 | | 0.08 | |
| | +5 | 3.43 | 3.35 | 3.71 | 3.89 | 0.194 | 0.18 | | | |
| | +6 | $3.27^{ab}$ | $3.17^{a}$ | $3.69^{b}$ | $3.48^{ab}$ | 0.164 | 0.13 | | | |
| | +7 | 3.13 | 3.29 | 3.45 | 3.47 | 0.157 | | 0.12 | | |
| | +8 | $3.15^{ab}$ | $3.34^{ab}$ | $3.68^{b}$ | $3.14^{a}$ | 0.195 | 0.17 | | | 0.05 |
| | +1 through +4 | $4.36^{ab}$ | $4.23^{a}$ | $4.53^{ab}$ | $4.79^{b}$ | 0.161 | 0.08 | | | |
| | +5 through +8 | $3.19^{a}$ | $3.27^{ab}$ | $3.63^{b}$ | $3.43^{ab}$ | 0.134 | 0.10 | 0.09 | | |
| | +1 through +8 | $3.81^{ab}$ | $3.75^{a}$ | $4.09^{ab}$ | $4.13^{b}$ | 0.125 | 0.08 | 0.19 | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2.
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2.
$a,b$For any row where a P(01) value appears and superscript letters are provided for the data of that row, data without any common superscript letter differ from each other at a probability P of <0.05

Data presented in Table 17 illustrates sorbitol feeding according to the present invention significantly increased the fat concentration in milk produced by the multiparious rumi- Data presented in Table 17 also indicates there are benefits to feeding sorbitol during both the pre-partum period and the early post-partum period, as opposed to only during the pre-partum period. For example, the fat concentration in milk produced by the multiparious ruminants of Pre/Post Trial #2 was 13.24% (P<0.05) greater than the fat concentration in milk produced by the multiparious ruminants of Pre-Partum Trial #2, as measured over the entire early post-partum period (week +1 through week +4). Also, the fat concentration in milk produced by the multiparious ruminants of Pre/Post Trial #2 was 10.1% (P<0.05) greater than the fat concentration in milk produced by the multiparious ruminants of Pre-Partum Trial #2, as measured from the beginning of the early post-partum period through week +8 following the early post-partum period of Example Two. Furthermore, the rate of 4% fat-corrected milk production by the multiparious ruminants of Pre/Post Trial #2 was 24.6% (P<0.05) greater than the rate of 4% fat-corrected milk production by the multiparious ruminants of Pre-Partum Trial #2, as measured during week +1 of the early post-partum period.

Finally, data in Table 17 indicates that feeding sorbitol at a higher rate during the early post-partum period, in addition to feeding sorbitol during the pre-partum period, has beneficial effects. For example, the rate of 4% fat-corrected milk production by the multiparious ruminants of Pre/Post Trial #1 was 15.1% (P=0.02) greater than the rate of 4% fat-corrected milk production by the multiparious ruminants of Pre/Post Trial #2, as measured during week +8. Also, the fat concentration in milk produced by the multiparious ruminants of Pre/Post Trial #1 was 17.2% (P<0.05) greater than the fat concentration in milk produced by the multiparious ruminants of Pre/Post Trial #2, as measured during week +8.

In Table 18, means of the true protein concentration in milk produced by the multiparious cows derived from the raw data of Pre-Partum Trial #2, Pre/Post Trial #1, Pre/Post Trial #2, and Control Trial #2 are provided.

TABLE 18

| | Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|
| True Protein Content of Produced Milk (weight %) | +1 | 3.88 | 3.95 | 4.01 | 3.96 | 0.143 | | | | |
| | +2 | 3.15 | 3.14 | 3.17 | 3.13 | 0.0630 | | | | |
| | +3 | 2.77 | 2.81 | 2.85 | 2.89 | 0.0509 | | 0.16 | | |
| | +4 | $2.65^a$ | $2.71^{ab}$ | $2.73^{ab}$ | $2.77^b$ | 0.0426 | | 0.07 | | |
| | +5 | 2.63 | 2.63 | 2.65 | 2.70 | 0.0414 | | | | |
| | +6 | 2.59 | 2.62 | 2.61 | 2.69 | 0.0450 | | | | |
| | +7 | 2.58 | 2.60 | 2.57 | 2.64 | 0.0423 | | | | |
| | +8 | 2.60 | 2.56 | 2.65 | 2.61 | 0.0391 | | | | |
| | +1 through +4 | 3.04 | 3.11 | 3.18 | 3.18 | 0.0557 | | 0.07 | | |
| | +5 through +8 | 2.60 | 2.60 | 2.62 | 2.66 | 0.0370 | | | | |
| | +1 through +8 | 2.82 | 2.86 | 2.90 | 2.91 | 0.0428 | | 0.13 | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2..
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2
$a,b$ For any row where a P(01) value appears and superscript letters are provided for the data of that row, data without any common superscript letter differ from each other at a probability P of <0.05

Data presented in Table 18 illustrates sorbitol feeding according to the present invention significantly increased the true protein concentration in milk produced by the multiparious ruminants by 3.8% (P=0.07) (average of means of Pre-Partum Trial #2, Pre/Post Trial #1, and Pre/Post Trial #2) versus the true protein concentration in milk produced by the multiparious ruminants of Control Trial #2, as measured over the entire early post-partum period of Example Two. Furthermore, sorbitol feeding according to the present invention significantly increased the true protein concentration in milk produced by the multiparious ruminants by 2.5% (P=0.13) (average of means of Pre-Partum Trial #2, Pre/Post Trial #1, and Pre/Post Trial #2) versus the true protein concentration in milk produced by the multiparious ruminants of Control Trial #2, as measured from the beginning of the early post-partum period through week +8 of Example Two.

In Table 19, means of the lactose concentration in milk produced by the multiparious cows derived from the raw data of Pre-Partum Trial #2, Pre/Post Trial #1, Pre/Post Trial #2, and Control Trial #2 are provided.

TABLE 19

| | Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|
| Lactose Content of Produced Milk (weight %) | +1 | 4.39 | 4.42 | 4.55 | 4.47 | 0.0862 | | | | |
| | +2 | $4.70^a$ | $4.69^a$ | $4.79^{ab}$ | $4.84^b$ | 0.0492 | 0.11 | 0.18 | | |
| | +3 | $4.77^{ab}$ | $4.74^a$ | $4.87^{ab}$ | $4.92^b$ | 0.0515 | 0.07 | | | |
| | +4 | $4.74^a$ | $4.75^a$ | $4.90^b$ | $4.90^b$ | 0.0518 | 0.04 | 0.07 | | |

TABLE 19-continued

| Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|
| +5 | 4.78$^{ab}$ | 4.74$^a$ | 4.93$^c$ | 4.90$^{bc}$ | 0.0492 | 0.03 | | | |
| +6 | 4.75$^a$ | 4.75$^a$ | 4.90$^{ab}$ | 4.92$^b$ | 0.0538 | 0.04 | 0.09 | | |
| +7 | 4.78$^a$ | 4.77$^a$ | 4.90$^{ab}$ | 4.96$^b$ | 0.0504 | 0.02 | 0.10 | | |
| +8 | 4.76$^a$ | 4.76$^a$ | 4.84$^{ab}$ | 4.93$^b$ | 0.0462 | 0.03 | 0.09 | | 0.18 |
| +1 through +4 | 4.66 | 4.65 | 4.78 | 4.78 | 0.0494 | 0.13 | 0.19 | | |
| +5 through +8 | 4.77$^a$ | 4.76$^a$ | 4.89$^{ab}$ | 3.93$^b$ | 0.0468 | 0.03 | 0.10 | | |
| +1 through +8 | 4.72$^a$ | 4/71$^a$ | 4.83$^{ab}$ | 4.85$^b$ | 0.0461 | 0.05 | 0.12 | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2..
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2
$^{a,b}$For any row where a P(01) value appears and superscript letters are provided for the data of that row, data without any common superscript letter differ from each other at a probability P of <0.05

Data presented in Table 19 illustrates sorbitol feeding according to the present invention significantly increased the lactose concentration in milk produced by the multiparious ruminants by 1.7% (P=0.19) (average of means of Pre-Partum Trial #2, Pre/Post Trial #1, and Pre/Post Trial #2) versus the lactose concentration in milk produced by the multiparious ruminants of Control Trial #2, as measured over the entire early post-partum period of Example Two. Additionally, sorbitol feeding according to the present invention significantly increased the lactose concentration in milk produced by the multiparious ruminants by 1.6% (P=0.12) (average of means of Pre-Partum Trial #2, Pre/Post Trial #1, and Pre/Post Trial #2) versus the lactose concentration in milk produced by the multiparious ruminants of Control Trial #2, as measured from the beginning of the early post-partum period through week +8 of Example Two.

Data presented in Table 19 also indicates there are benefits to feeding sorbitol during both the pre-partum period and the early post-partum period, as opposed to only during the pre-partum period. For example, the lactose concentration in milk produced by the multiparious ruminants of Pre/Post Trial #2 was 3.0% (P<0.05) greater than the lactose concentration in milk produced by the multiparious ruminants of Pre-Partum Trial #2, as measured from the beginning of the early post-partum period through week +8 following the early post-partum period of Example Two.

In Table 20, means of the total solids concentration in milk produced by the multiparious cows derived from the raw data of Pre-Partum Trial #2, Pre/Post Trial #1, Pre/Post Trial #2, and Control Trial #2 are provided.

TABLE 20

| | Week(s) | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|
| Total Solids Content of Produced Milk (weight %) | +1 | 14.9$^{ab}$ | 14.4$^a$ | 15.3$^{ab}$ | 15.6$^b$ | 0.371 | 0.13 | | | |
| | +2 | 13.15 | 13.25 | 12.28 | 13.61 | 0.235 | | | | |
| | +3 | 12.66 | 12.54 | 12.84 | 12.92 | 0.259 | | | | |
| | +4 | 11.95$^{ab}$ | 11.76$^a$ | 12.54$^c$ | 12.43$^{bc}$ | 0.186 | 0.01 | 0.17 | | |
| | +5 | 11.73 | 11.60$^a$ | 12.17$^{ab}$ | 12.38$^b$ | 0.200 | 0.02 | 0.16 | | |
| | +6 | 11.41$^a$ | 11.43$^a$ | 12.08$^b$ | 11.89$^{ab}$ | 0.197 | 0.05 | 0.09 | | |
| | +7 | 11.29 | 11.55 | 11.71 | 11.64 | 0.196 | | 0.12 | | |
| | +8 | 11.23$^a$ | 11.45$^{ab}$ | 12.06$^b$ | 11.57$^{ab}$ | 0.230 | 0.08 | 0.08 | | 0.14 |
| | +1 through +4 | 13.00$^a$ | 12.94$^a$ | 13.49$^{ab}$ | 13.63$^b$ | 0.203 | 0.04 | 0.13 | | |
| | +5 through +8 | 11.42$^a$ | 11.51$^a$ | 12.02$^b$ | 11.87$^{ab}$ | 0.169 | 0.04 | 0.05 | | |
| | +1 through +8 | 12.20$^a$ | 12.23$^a$ | 12.76$^b$ | 12.73$^b$ | 0.177 | 0.03 | 0.06 | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2..
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2
$^{a,b}$For any row where a P(01) value appears and superscript letters are provided for the data of that row, data without any common superscript letter differ from each other at a probability P of <0.05

Data presented in Table 20 illustrates sorbitol feeding according to the present invention significantly increased the total solids concentration in milk produced by the multiparious ruminants by 2.7% (P=0.13) (average of means of Pre-Partum Trial #2, Pre/Post Trial #1, and Pre/Post Trial #2) versus the total solids concentration in milk produced by the multiparious ruminants of Control Trial #2, as measured over the entire early post-partum period of Example Two. Additionally, sorbitol feeding according to the present invention significantly increased the total solids concentration in milk produced by the multiparious ruminants by 3.3% (P=0.05) (average of means of Pre-Partum Trial #2, Pre/Post Trial #1, and Pre/Post Trial #2) versus the total solids concentration in milk produced by the multiparious ruminants of Control Trial #2, as measured from week +5 through week +8 of Example Two. Furthermore, sorbitol feeding according to the present invention significantly increased the total solids concentration in milk produced by the multiparious ruminants by 1.1% (P=0.06) (average of means of Pre-Partum Trial #2, Pre/Post Trial #1, and Pre/Post Trial #2) versus the total solids concentration in milk produced by the multiparious ruminants of Control Trial #2, as measured from the beginning of the early post-partum period through week +8 of Example Two.

Other data presented in Table 20 further illustrates that sorbitol feeding according to the present invention significantly increased the total solids concentration in milk produced by multiparious ruminants. For example, the total solids concentration in milk produced by the multiparious ruminants of Pre/Post Trial #2 was 4.8% (P<0.05) greater than the total solids concentration in milk produced by the multiparious ruminants of Control Trial #2, as measured over the entire early post-partum period of Example Two. Additionally, the total solids concentration in milk produced by the multiparious ruminants of Pre/Post Trial #1 was 5.2% (P<0.05) greater than the total solids concentration in milk produced by the multiparious ruminants of Control Trial #2, as measured from week +5 through week +8 of Example Two. Furthermore, the total solids concentration in milk produced by the multiparious ruminants of Pre/Post Trial #1 was 4.6% (P<0.05) greater than the total solids concentration in milk produced by the multiparious ruminants of Control Trial #2, as measured from the beginning of the early post-partum period through week +8 of Example Two. Finally, the total solids concentration in milk produced by the multiparious ruminants of Pre/Post Trial #2 was 4.3% (P<0.05) greater than the total solids concentration in milk produced by the multiparious ruminants of Control Trial #2, as measured from the beginning of the early post-partum period through week +8 of Example Two.

Data presented in Table 20 also indicates there are benefits to feeding sorbitol during both the pre-partum period and the early post-partum period, as opposed to only during the pre-partum period. For example, the total solids concentration in milk produced by the multiparious ruminants of Pre/Post Trial #2 was 5.3% (P<0.05) greater than the total solids concentration in milk produced by the multiparious ruminants of Pre-Partum Trial #2, as measured over the entire early post-partum period of Example Two. Additionally, the total solids concentration in milk produced by the multiparious ruminants of Pre/Post Trial #1 was 4.4% (P<0.05) greater than the total solids concentration in milk produced by the multiparious ruminants of Pre-Partum Trial #2, as measured from week +5 through week +8 of Example Two. Furthermore, the total solids concentration in milk produced by the multiparious ruminants of Pre/Post Trial #1 was 4.3% (P<0.05) greater than the total solids concentration in milk produced by the multiparious ruminants of Pre-Partum Trial #2, as measured from the beginning of the early post-partum period through week +8 of Example Two. Finally, the total solids concentration in milk produced by the multiparious ruminants of Pre/Post Trial #2 was 4.1% (P<0.05) greater than the total solids concentration in milk produced by the multiparious ruminants of Pre-Partum Trial #2, as measured from the beginning of the early post-partum period through week +8 of Example Two.

In Table 21, means derived from the raw data for the non-esterified fatty acid (NEFA) concentration in the blood of the multiparious cows participating in Pre-Partum Trial #2, Pre/Post Trial #1, Pre/Post Trial #2, and Control Trial #2 are provided at various points during the pre-partum period and the early post-partum period and proximate the junction of the pre-partum period and the early post-partum period.

TABLE 21

|  | Day | Target* | Control Trial #2 | Pre-Partum Trial #2 | Pre/Post Trial #1 | Pre/Post Trial #2 | SEM | P (01) | P (02) | P (03) | P (04) |
|---|---|---|---|---|---|---|---|---|---|---|---|
| Non-Esterified Fatty Acid | −21 | <0.3 | 0.099 | 0.103 | 0.141 | 0.114 | 0.0282 | | | | |
| (NEFA) | −7 | <0.35 | 0.133 | 0.122 | 0.107 | 0.119 | 0.277 | | | | |
| Concentration in Blood | 0 (Calving) | <1.0 | $0.705^b$ | $0.470^{ab}$ | $0.416^a$ | $0.637^{ab}$ | 0.951 | 0.12 | 0.07 | 0.08 | 0.11 |
| (mEq/l) | +10 | <0.7 | 0.477 | 0.372 | 0.476 | 0.556 | 0.0671 | | | | |

P(01): Probability that means provided in row for Pre-Partum Trial #2, Pre/Post Trial #1, Pre/Post Trial #2, and/or Control Trial #2 may be explained solely by the difference between the feeding protocol(s) of Pre-Partum Trial #2, Pre/Post Trial #1, Pre/Post Trial #2, and/or Control Trial #2.
P(02): Probability that differences between the average of the three means provided in row for Pre-Partum Trial #2, Pre/Post Trial #1, and Pre/Post Trial #2 versus the mean data provided in same row for Control Trial #2 may be explained solely by the difference between the feeding protocol(s) of Pre-Partum Trial #2, Pre/Post Trial #1, and/or Pre/Post Trial #2 versus the feeding protocol of Control Trial #2.
P(03): Probability that differences between the means provided in row for Pre-Partum Trial #2 versus the mean data provided in same row for Control Trial #2 may be explained solely by the difference between the feeding protocol of Pre-Partum Trial #2 versus the feeding protocol of Control Trial #2.
P(04): Probability that differences between the means provided in row for Pre/Post Trial #1 versus the mean data provided in same row for Pre/Post Trial #2 may be explained solely by the difference between the feeding protocol of Pre/Post Trial #1 versus the feeding protocol of Pre/Post Trial #2
$^{a,b}$For any row where a P(01) value appears and superscript letters are provided for the data of that row, data without any common superscript letter differ from each other at a probability P of <0.05
*The Target blood concentrations for non-esterified fatty acid (NEFA) are recommended in Herdt, T. H; Dart, B.; Neuder, L; Will Large Dairy Herds Lead to the Revival of Metabolic Profile Testing; vol. 34, Proceedings of the American Association of Bovine Practitioners (AABP) from the 34th Annual Conference of the AABP (September, 2001, Vancouver, BC, Canada)

Data presented in Table 21 suggests that feeding sorbitol in accordance with the present invention substantially and significantly improves the energy balance of multiparous ruminants proximate the time the multiparous ruminants give birth. This helps explain why feeding sorbitol in accordance with the present invention produces other beneficial effects, such as increased fat-corrected milk production and increased milk component concentrations, and increased dry matter feed intake after the multiparous ruminants give birth. Indeed, as shown in Table 21, the concentrations of non-esterified fatty acid (NEFA) in blood for all three of the sorbitol feeding trials in accordance with the present invention are lower than the NEFA concentrations in blood found during Control Trial #2 and are well below the target NEFA concentrations in blood recommended in the Herdt et. al. document, both the week before calving and at calving.

The NEFA concentration in blood is a sensitive indicator of the energy balance for a particular ruminant. Higher NEFA concentrations in blood are a good indicator the ruminant being tested is in a negative energy balance condition and is excessively mobilizing stored energy resources; conversely, lower NEMA concentrations in blood are a good indicator the ruminant being tested is in a positive energy balance condition and has an adequate reserve of stored energy resources. Particularly soon before calving and proximate calving, it is desirable for ruminants to be in a positive energy balance condition that will tend to assure the ruminant recovers quickly from the stress of calving and thereby increases intake of feed and production of milk rapidly following calving.

With regard to the data provided in Table 21, the concentration of non-esterified fatty acid (NEFA) in the blood of the multiparious ruminants of Pre/Post Trial #2 was 42% lower (P<0.05) than the concentration of non-esterified fatty acid (NEFA) in the blood of the multiparious ruminants of Control Trial #2, as measured at about the time the various multiparous ruminants gave birth. Additionally, the concentration of non-esterified fatty acid (NEFA) in the blood of the multiparious ruminants fed sorbitol in accordance with the present invention (average of means of Pre-Partum Trial #2, Pre/Post Trial #1, and Pre/Post Trial #2) was collectively 28% lower (P<0.05) than the concentration of non-esterified fatty acid (NEFA) in the blood of the multiparious ruminants of Control Trial #2, as measured at about the time the various multiparous ruminants gave birth.

The means provided in Tables 22-27 are based solely on multiparous cows that were included in Pre/Post Trial #1 or Control Trial #2. In Table 22, means of dry matter feed intake data derived from the raw data of the multiparious cows participating in the Pre/Post Trial #1 and Control Trial #2 are provided.

TABLE 22

| | | Week(s) | Control Trial #2 | Pre/Post Trial #1 | SEM | P |
|---|---|---|---|---|---|---|
| Dry Matter Feed Intake (lbs/day) | Pre-partum | −3 | 32.6 | 30.7 | 1.12 | |
| | | −2 | 36.7 | 35.2 | 1.12 | |
| | | −1 | 34.5 | 33.4 | 1.40 | |
| | | −3 through −1 | 34.6 | 33.0 | 0.891 | |
| | Post-partum | +1 | 34.7 | 36.7 | 1.30 | |
| | | +2 | 42.8 | 45.6 | 1.55 | |
| | | +3 | 45.9 | 48.8 | 1.57 | |
| | | +4 | 49.6 | 51.5 | 1.61 | |
| | | +5 | 51.5 | 54.2 | 1.34 | |
| | | +6 | 53.0 | 54.1 | 1.39 | |
| | | +7 | 54.0 | 54.9 | 1.39 | |
| | | +8 | 54.6 | 57.4 | 1.87 | |
| | | +1 through +4 | 43.2 | 45.7 | 1.33 | |
| | | +5 through +8 | 53.3 | 55.3 | 1.37 | |
| | | +1 through +8 | 48.3 | 50.4 | 1.22 | |
| Change in Dry Matter Feed Intake (lbs/day) | | −2 versus −1 | −2.22 | −1.83 | 1.19 | |
| | | +1 versus −1 | 0.16 | 3.35 | 1.26 | 0.09 |

Figure 4:
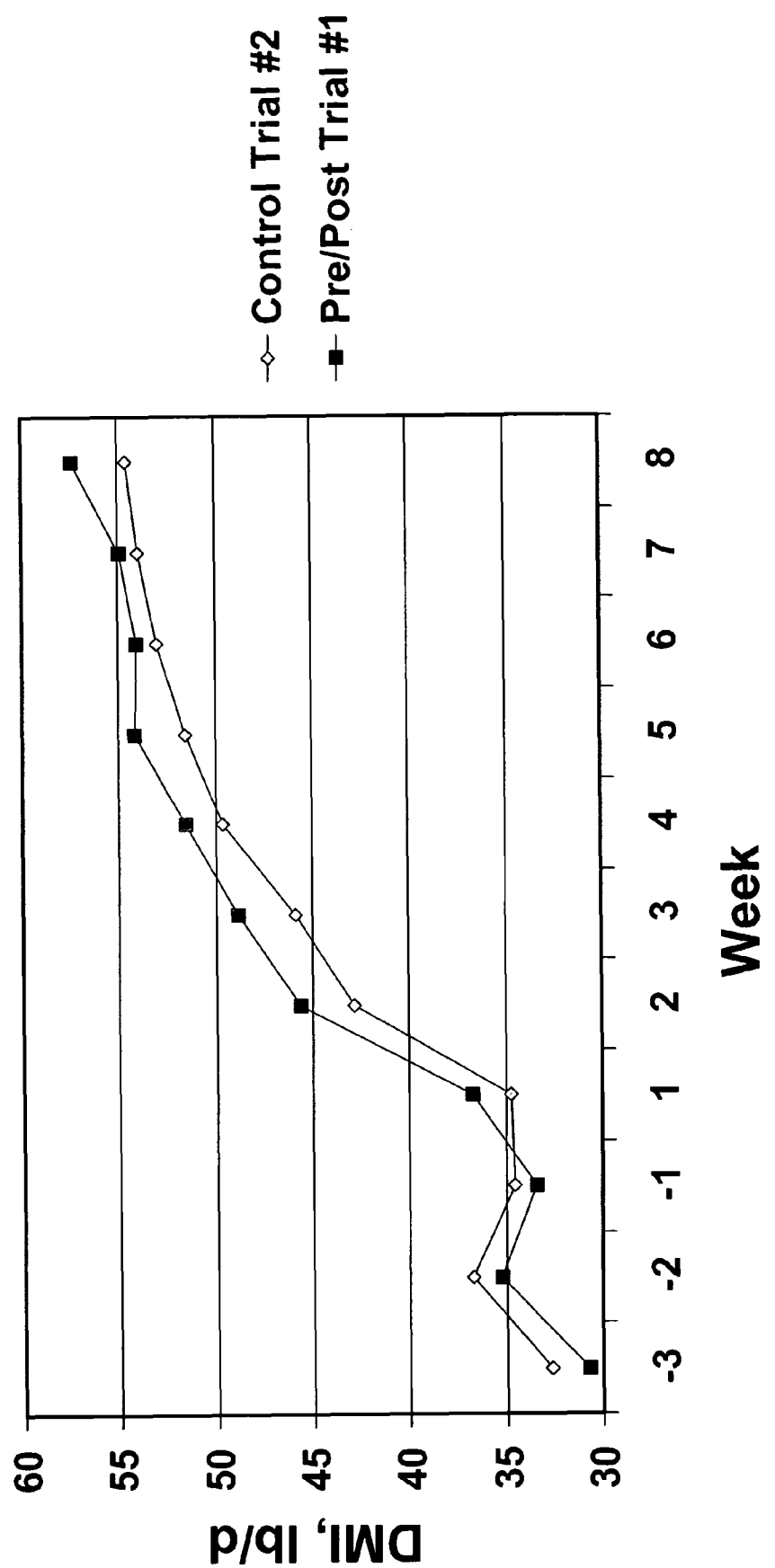
FIG. 4 is a graph depicting differences in dry matter intake in multiparous cows that are fed the control ration versus multiparous cows that are fed the control ration, along with sugar alcohol during both a pre-partum period and an early post-partum period, in accordance with the present invention.

The data of Table 22 shows the multiparous ruminants of Pre/Post Trial #1 increased dry matter feed intake by a numeric amount that was 3.19 pounds per day greater, or nearly twenty times larger (P=0.09), as compared to the multiparious ruminants of Control Trial #2, when looking at the week (−1) before calving versus the week (+1) after calving. This substantial and significant dry matter feed intake recovery and increase reflects the beneficially high energy balance of the multiparous ruminants of Pre/Post Trial #1 that is directly attributable to sorbitol feeding in accordance with the present invention. FIG. 4 is a plot of the daily dry matter feed intake weights for the multiparious cows of Pre/Post Trial #1 versus the multiparious cows of Control Trial #2, by week extending from the beginning of the pre-partum period (weeks −3 through −1), through the early post-partum period (weeks +1 through +4), and through week +8.

In Table 23, means of daily milk production rates, daily 4% fat-corrected milk production rates, and fat concentration in produced milk derived from the raw data of the multiparious cows participating in the Pre/Post Trial #1 and Control Trial #2 are provided.

TABLE 23

| | Week(s) | Control Trial #2 | Pre/Post Trial #1 | SEM | P |
|---|---|---|---|---|---|
| Milk Production | +1 | 67.4 | 68.4 | 2.99 | |
| | +2 | 94.9 | 93.9 | 2.94 | |
| (As Is Basis - lbs/day) | +3 | 104 | 104 | 3.82 | |
| | +4 | 109 | 109 | 4.26 | |
| | +5 | 11 | 113 | 4.26 | |
| | +6 | 114 | 113 | 4.02 | |
| | +7 | 115 | 112 | 3.36 | |
| | +8 | 113 | 115 | 4.17 | |
| | +1 through +4 | 93.8 | 94.1 | 3.15 | |
| | +5 through +8 | 113 | 113 | 3.76 | |
| | +1 through +8 | 104 | 104 | 3.26 | |
| Milk Production (4.0% fat basis - lbs/day) | +1 | 79.8 | 82.4 | 4.57 | |
| | +2 | 100.1 | 99.7 | 4.00 | |
| | +3 | 107 | 107 | 3.98 | |
| | +4 | 104 | 109 | 3.89 | |
| | +5 | 100 | 108 | 4.10 | 0.19 |
| | +6 | 98 | 109 | 4.03 | 0.08 |
| | +7 | 101 | 103 | 4.23 | |
| | +8 | 96 | 109 | 5.20 | 0.10 |
| | +1 through +4 | 98.3 | 99.7 | 3.25 | |
| | +5 through +8 | 99 | 107 | 3.62 | 0.13 |
| | +1 through +8 | 99 | 103 | 3.13 | |
| Fat Content of Produced Milk (weight %) | +1 | 5.32 | 5.49 | 0.363 | |
| | +2 | 4.39 | 4.41 | 0.202 | |
| | +3 | 4.22 | 4.22 | 0.208 | |
| | +4 | 3.77 | 4.01 | 0.155 | |
| | +5 | 3.43 | 3.71 | 0.164 | |
| | +6 | 3.27 | 3.69 | 0.161 | 0.07 |
| | +7 | 3.13 | 3.45 | 0.174 | |
| | +8 | 3.15 | 3.68 | 0.227 | 0.11 |
| | +1 through +4 | 4.36 | 4.53 | 0.163 | |
| | +5 through +8 | 3.19a | 3.63 | 0.130 | 0.02 |
| | +1 through +8 | 3.81 | 4.09 | 0.127 | 0.12 |

Data presented in Table 23 illustrates sorbitol feeding according to the present invention significantly increased the fat concentration in milk produced by the multiparious ruminants of Pre/Post Trial #1 by 13.8% (P=0.02) versus the fat concentration in milk produced by the multiparious ruminants of Control Trial #2, as measured over weeks +5 through +8 following the early postpartum period of Example Two. Furthermore, data presented in Table 23 illustrates sorbitol feeding according to the present invention significantly increased the fat concentration in milk produced by the multiparious ruminants of Pre/Post Trial #1 by 7.3% (P=0.12) versus the fat concentration in milk produced by the multiparious ruminants of Control Trial #2, as measured from the beginning of the early post-partum period through week +8 of Example Two.

Figure 5:
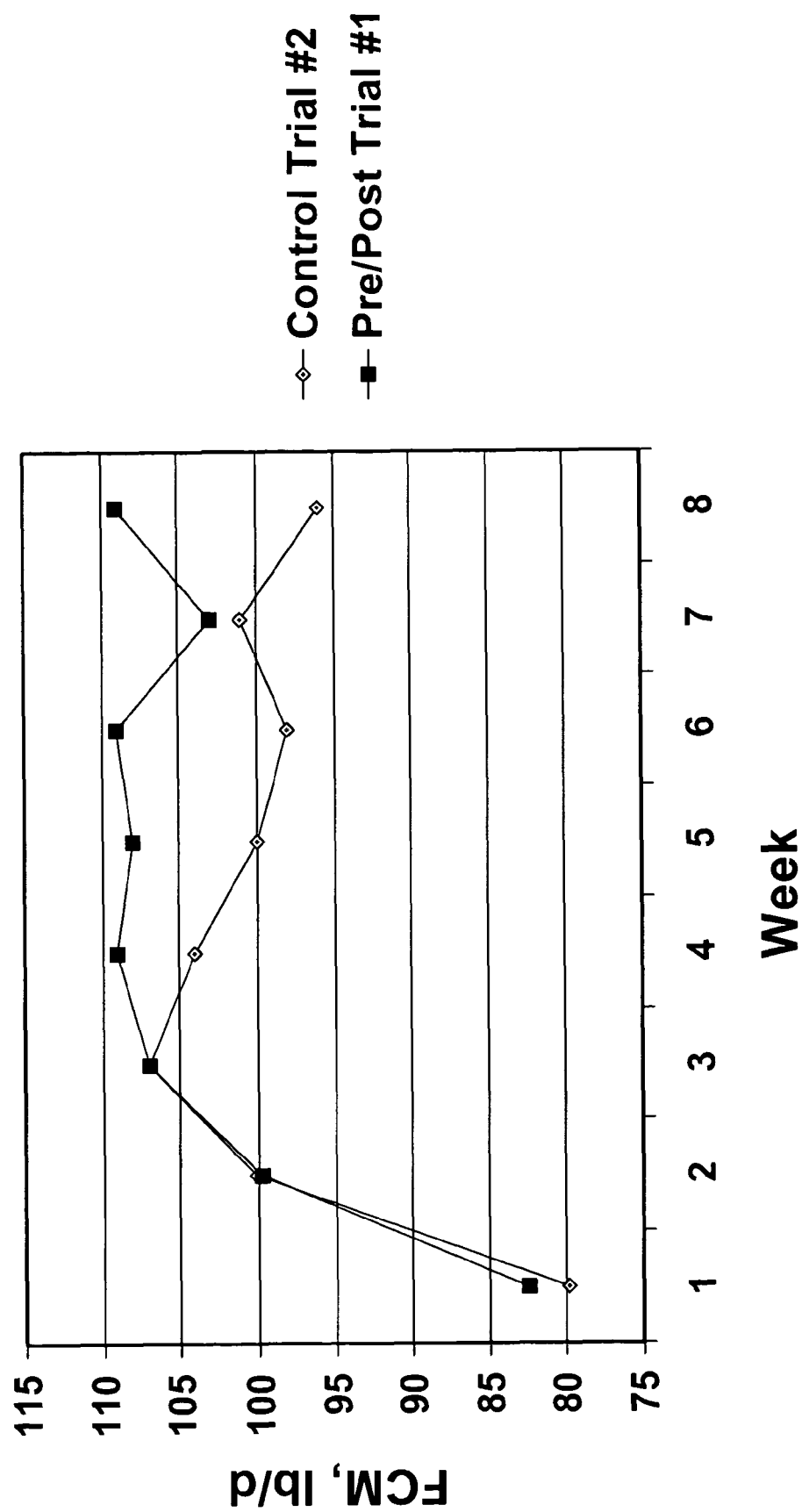
FIG. 5 is a graph depicting differences in the weight of 4% fat-corrected milk production by multiparous cows that are fed the control ration versus multiparous cows that are fed the control ration, along with sugar alcohol during both a pre-partum period and an early post-partum period, in accordance with the present invention.

Additionally, data presented in Table 23 illustrates sorbitol feeding according to the present invention increased production of 4% fat-corrected milk by the multiparious ruminants of Pre/Post Trial #1 8.1% (P=0.13), as compared to the multiparious ruminants of Control Trial #2 over weeks +5 through +8 following the early post-partum period of Example Two. FIG. 5 is a plot of the daily weight production of 4% fat corrected milk for the multiparious cows of Pre/Post Trial #1 versus the multiparious cows of Control Trial #2, by week extending from the beginning of the early post-partum period (weeks +1 through +4) through week +8.

In Table 24, means of true protein concentration in produced milk derived from the raw data of the multiparious cows participating in the Pre/Post Trial #1 and Control Trial #2 are provided.

TABLE 24

|  | Week(s) | Control Trial #2 | Pre/Post Trial #1 | SEM | P |
|---|---|---|---|---|---|
| True Protein Content of Produced Milk (weight %) | +1 | 3.88 | 4.01 | 0.149 | |
| | +2 | 3.15 | 3.17 | 0.0588 | |
| | +3 | 2.77 | 2.85 | 0.0468 | |
| | +4 | 2.65 | 2.73 | 0.0413 | 0.17 |
| | +5 | 2.63 | 2.65 | 0.0434 | |
| | +6 | 2.59 | 2.61 | 0.0367 | |
| | +7 | 2.58 | 2.57 | 0.0404 | |
| | +8 | 2.60 | 2.65 | 0.0417 | |
| | +1 through +4 | 3.04 | 3.18 | | 0.08 |
| | +5 through +8 | 2.60 | 2.62 | | |
| | +1 through +8 | 2.82 | 2.90 | | 0.16 |

Data presented in Table 24 illustrates sorbitol feeding according to the present invention significantly increased the true protein concentration in milk produced by the multiparious ruminants of Pre/Post Trial #1 by 4.6% (P=0.08) versus the true protein concentration in milk produced by the multiparious ruminants of Control Trial #2, as measured over the entire early post-partum period of Example Two. Furthermore, data presented in Table 24 illustrates sorbitol feeding according to the present invention significantly increased the true protein concentration in milk produced by the multiparious ruminants of Pre/Post Trial #1 by 2.8% (P=0.16) versus the true protein concentration in milk produced by the multiparious ruminants of Control Trial #2, as measured from the beginning of the early post-partum period through week +8 of Example Two.

In Table 25, means of lactose concentration in produced milk derived from the raw data of the multiparious cows participating in the Pre/Post Trial #1 and Control Trial #2 are provided.

TABLE 25

|  | Week(s) | Control Trial #2 | Pre/Post Trial #1 | SEM | P |
|---|---|---|---|---|---|
| Lactose Content of Produced Milk (weight %) | +1 | 4.39 | 4.55 | 0.0836 | 0.17 |
| | +2 | 4.70 | 4.79 | 0.0513 | |
| | +3 | 4.77 | 4.87 | 0.0575 | |
| | +4 | 4.74 | 4.90 | 0.0555 | 0.05 |
| | +5 | 4.78 | 4.93 | 0.0524 | 0.07 |
| | +6 | 4.75 | 4.90 | 0.0563 | 0.08 |
| | +7 | 4.78 | 4.90 | 0.0511 | 0.11 |
| | +8 | 4.76 | 4.84 | 0.0481 | |
| | +1 through +4 | 4.66 | 4.78 | | 0.13 |
| | +5 through +8 | 4.77 | 4.89 | | 0.09 |
| | +1 through +8 | 4.72 | 4.83 | | 0.10 |

Data presented in Table 25 illustrates sorbitol feeding according to the present invention significantly increased the lactose concentration in milk produced by the multiparious ruminants of Pre/Post Trial #1 by more than 2.5% (P=0.13) versus the lactose concentration in milk produced by the multiparious ruminants of Control Trial #2, as measured over the entire early post-partum period of Example Two. Additionally, sorbitol feeding according to the present invention significantly increased the lactose concentration in milk produced by the multiparious ruminants of Pre/Post Trial #1 by more than 2.5% (P=0.09) versus the lactose concentration in milk produced by the multiparious ruminants of Control Trial #2, as measured over weeks +5 through +8 following the early post-partum period of Example Two. Furthermore, data presented in Table 25 illustrates sorbitol feeding according to the present invention significantly increased the lactose concentration in milk produced by the multiparious ruminants of Pre/Post Trial #1 by 1.9% (P=0.10) versus the lactose concentration in milk produced by the multiparious ruminants of Control Trial #2, as measured from the beginning of the early post-partum period through week +8 of Example Two.

In Table 26, means of total solids concentration in produced milk derived from the raw data of the multiparious cows participating in the Pre/Post Trial #1 and Control Trial #2 are provided.

TABLE 26

|  | Week(s) | Control Trial #2 | Pre/Post Trial #1 | SEM | P |
|---|---|---|---|---|---|
| Total Solids Content of Produced Milk (weight %) | +1 | 14.9 | 15.3 | 0.383 | |
| | +2 | 13.15 | 13.28 | 0.224 | |
| | +3 | 12.66 | 12.84 | 0.228 | |
| | +4 | 11.95 | 12.54 | 0.185 | 0.03 |
| | +5 | 11.73 | 12.17 | 0.170 | 0.07 |
| | +6 | 11.41 | 12.08 | 0.179 | 0.01 |
| | +7 | 11.29 | 11.71 | 0.194 | 0.13 |
| | +8 | 11.23 | 12.06 | 0.253 | 0.03 |
| | +1 through +4 | 13.00 | 13.49 | 0.204 | 0.10 |
| | +5 through +8 | 11.42 | 12.02 | 0.162 | 0.01 |
| | +1 through +8 | 12.20 | 12.76 | 0.172 | 0.03 |

Data presented in Table 26 suggests sorbitol feeding according to the present invention significantly increased the total solids concentration in milk produced by the multiparious ruminants of Pre/Post Trial #1 by more than 3.7% (P=0.19) versus the total solids concentration in milk produced by the multiparious ruminants of Control Trial #2, as measured over the entire early post-partum period of Example Two. Additionally, sorbitol feeding according to the present invention significantly increased the total solids concentration in milk produced by the multiparious ruminants of Pre/Post Trial #1 by more than 5.2% (P=0.01) versus the total solids concentration in milk produced by the multiparious ruminants of Control Trial #2, as measured over weeks +5 through +8 following the early post-partum period of Example Two. Furthermore, data presented in Table 26 illustrates sorbitol feeding according to the present invention significantly increased the total solids concentration in milk produced by the multiparious ruminants of Pre/Post Trial #1 by nearly 4.6% (P=0.03) versus the total solids concentration in milk produced by the multiparious ruminants of Control Trial #2, as measured from the beginning of the early post-partum period through week +8 of Example Two.

In Table 27, means of the concentration of non-esterified fatty acid in the blood of multiparious cows that is derived from the raw data of the multiparious cows participating in the Pre/Post Trial #1 and Control Trial #2 are provided.

TABLE 27

|  | Day | Target* | Control Trial #2 | Pre/Post Trial #1 | SEM | P |
|---|---|---|---|---|---|---|
| Non-Esterified Fatty Acid (NEFA) | −21 | <0.3 | 0.099 | 0.141 | 0.0368 | |
| | −7 | <0.35 | 0.133 | 0.107 | 0.0342 | |

TABLE 27-continued

|  | Day | Target* | Control Trial #2 | Pre/Post Trial #1 | SEM | P |
|---|---|---|---|---|---|---|
| Concentration in Blood (mEq/l) | 0 (Calving) | <1.0 | 0.705$^b$ | 0.416$^a$ | 0.0928 | 0.04 |
|  | +10 |  | 0.7 | 0.477 | 0.476 | 0.0632 |

*The Target blood concentrations for non-esterified fatty acid (NEFA) are recommended in Herdt, T. H; Dart, B.; Neuder, L; Will Large Dairy Herds Lead to the Revival of Metabolic Profile Testing; vol. 34, Proceedings of the American Association of Bovine Practitioners (AABP) from the 34$^{th}$ Annual Conference of the AABP (September, 2001, Vancouver, BC, Canada)

Figure 6:
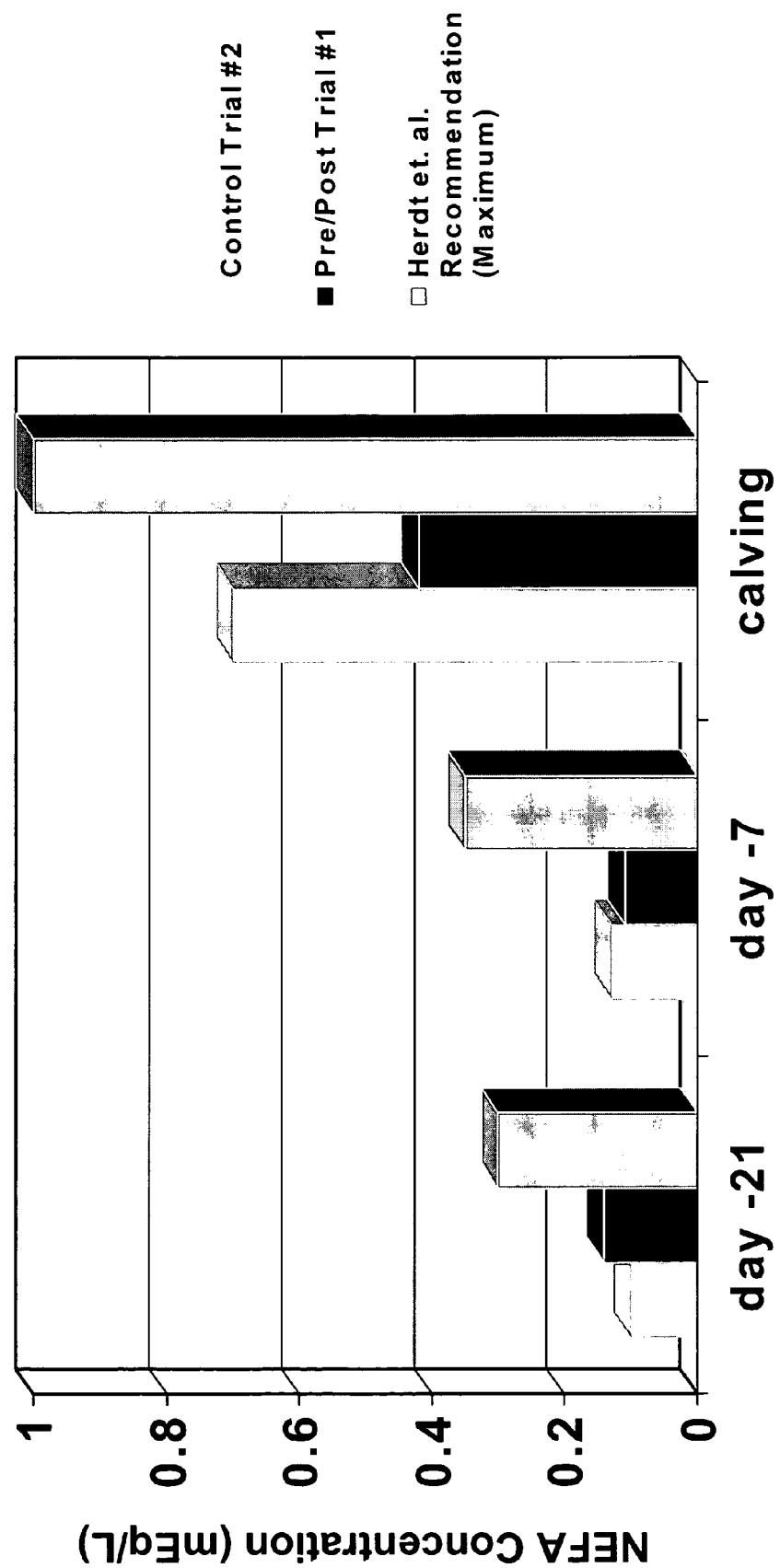
FIG. 6 is a graph depicting differences in the non-esterified fatty acid (NEFA) concentration in blood, at various times, in multiparous cows that are fed the control ration versus multiparous cows that are fed the control ration, along with sugar alcohol during at least a pre-partum period, in accordance with the present invention.

Data presented in Table 27 illustrates that feeding sorbitol in accordance with the present invention substantially and significantly improves the energy balance of multiparous ruminants at the time the multiparous ruminants give birth. This helps explain why feeding sorbitol in accordance with the present invention produces other beneficial effects, such as increased fat-corrected milk production and increased milk component concentrations, and increased dry matter feed intake after the multiparous ruminants give birth. Indeed, as shown in Table 27, the concentrations of non-esterified fatty acid (NEFA) in blood for Pre/Post Trial #1 are significantly lower {42% lower (P=0.04)} than the NEFA concentrations in blood found during Control Trial #2 and are well below the target NEFA concentrations in blood recommended in the Herdt et. al. document at calving. FIG. 6 is a plot of NEFA concentrations in blood for the multiparious cows of Pre/Post Trial #1 versus the multiparious cows of Control Trial #2 twenty days prior to calving (day −21), seven days prior to calving (day −7), and at calving (day 0).

Although the present invention has been described with reference to preferred embodiments, workers skilled in the art will recognize that changes may be made in form and detail without departing from the spirit and scope of the invention.

The invention claimed is:

1. A method of feeding a ruminant, the method comprising:
providing a feed that comprises sugar alcohol free of glycerol and at least one additional feed component, the feed free of rumen-protected fatty acid or comprising less than 10 weight percent rumen-protected fatty acid, based on the total weight of the feed; and
orally supplying the feed to the ruminant during a pre-partum period when the ruminant is pregnant, the ruminant ingesting the feed and sugar alcohol during the pre-partum period, the pre-partum period starting no more than about eight weeks before the ruminant gives birth;
wherein ingesting the feed during the pre-partum period causes the ruminant to exhibit enhanced milk production after giving birth.

2. The method of claim 1 wherein the ruminant ingests as little as about 50 grams of sugar alcohol per day during the pre-partum period.

3. The method of claim 2 wherein the ruminant ingests as much as about 200 grams of sugar alcohol per day during the pre-partum period.

4. The method of claim 1 wherein the ruminant ingests as much as about 200 grams of sugar alcohol per day during the pre-partum period.

5. The method of claim 1 wherein the average daily sugar alcohol ingestion of the ruminant during the pre-partum period is as low as about 50 grams of sugar alcohol per day.

6. The method of claim 5 wherein the average daily sugar alcohol ingestion of the ruminant during the pre-partum period is as high as about 200 grams of sugar alcohol per day.

7. The method of claim 1 wherein the average daily sugar alcohol ingestion of the ruminant during the pre-partum period is as high as about 200 grams of sugar alcohol per. day.

8. The method of claim 1 wherein the pre-partum period starts about three weeks before the ruminant gives birth.

9. The method of claim 8 wherein the pre-partum period ends at about the time the ruminant gives birth.

10. The method of claim 1 wherein the sugar alcohol comprises adonitol, allitol, altritol, arabinitol, dulcitol, erythritol, galaxitol, glucitol, glycerol, iditol, inositol, isomalt, lactitol, maltitol, mannitol, perseitol, ribitol, rhamnitol, threitol, sorbitol, xylitol, or any of these in any combination.

11. The method of claim 1 wherein the sugar alcohol comprises sorbitol.

12. The method of claim 1 wherein the ruminant of claim 1 is a first ruminant, the first ruminant ingesting from about 50 grams to about 200 grams of sugar alcohol per day during the pre-partum period and exhibiting the enhanced milk production after giving birth, as compared to milk production by a second ruminant after giving birth, the second ruminant fed identically as the first ruminant, with the exception that feed provided to the second ruminant during the pre-partum period is free of sugar alcohol, the first ruminant and the second ruminant substantially identical to each other.

13. The method of claim 1 wherein the ruminant of claim 1 is a first ruminant, the first ruminant ingesting from about 50 grams to about 200 grams of sugar alcohol per day during the pre-partum period and exhibiting enhanced production of 4% fat corrected milk after giving birth, as compared to production of 4% fat corrected milk by a second ruminant after giving birth, the second ruminant fed identically as the first ruminant, with the exception that feed provided to the second ruminant during the pre-partum period is free of sugar alcohol, the first ruminant and the second ruminant substantially identical to each other.

14. The method of claim 1 wherein the ruminant of claim 1 is a first ruminant, the first ruminant exhibiting enhanced daily feed intake on a dry basis after giving birth, as compared to daily dry basis feed intake by a second ruminant after giving birth, the second ruminant fed identically as the first ruminant, with the exception that feed provided to the second ruminant during the pre-partum period is free of sugar alcohol, the first ruminant and the second ruminant substantially identical to each other.

15. The method of claim 1 wherein the ruminant of claim 1 is a first ruminant, the first ruminant ingesting from about 50 grams to about 200 grams of sugar alcohol per day during the pre-partum period and producing milk with an enhanced component concentration after giving birth, as compared to the concentration of the component in milk produced by a second ruminant after giving birth, the second ruminant fed identically as the first ruminant, with the exception that feed provided to the second ruminant during the pre-partum period is free of sugar alcohol, the first ruminant and the second ruminant substantially identical to each other.

16. The method of claim 15 wherein the component of the milk is total fat, true protein, lactose, total solids, or any of these in any combination.

17. A method of feeding a ruminant, the method comprising:
providing a pre-partum feed that comprises a first sugar alcohol free of glycerol and at least one additional feed component, the pre-partum feed free of rumen-protected fatty acid or comprising less than 10 weight percent rumen-protected fatty acid, based on the total weight of the pre-partum feed;
orally supplying the pre-partum feed to the ruminant during a pre-partum period when the ruminant is pregnant, the ruminant ingesting the pre-partum feed and the first sugar alcohol during the pre-partum period, the pre-partum period starting no more than about eight weeks before the ruminant gives birth;
providing a first post-partum feed that comprises a second sugar alcohol and at least one additional feed component; and
orally supplying the first post-partum feed to the ruminant during a first post-partum period that starts after the ruminant gives birth, the ruminant ingesting the first post-partum feed and the second sugar alcohol during the first post-partum period;
wherein ingesting the pre-partum feed during the pre-partum period and the first post-partum feed during the first post-partum period causes the ruminant to exhibit enhanced milk production after giving birth.

18. The method of claim 17 wherein the ruminant ingests as little as about 50 grams of the second sugar alcohol per day during the first post-partum period.

19. The method of claim 18 wherein the ruminant ingests as much as about 200 grams of the second sugar alcohol per day during the first post-partum period.

20. The method of claim 17 wherein the ruminant ingests as much as about 200 grams of the second sugar alcohol per day during the first post-partum period.

21. The method of claim 17 wherein the average daily ingestion of the second sugar alcohol by the ruminant during the first post-partum period is as low as about 50 grams of the second sugar alcohol per day.

22. The method of claim 21 wherein the average daily ingestion of the second sugar alcohol by the ruminant during the first post-partum period is as high as about 200 grams of the second sugar alcohol per day.

23. The method of claim 17 wherein the average daily ingestion of the second sugar alcohol by the ruminant during the first post-partum period is as high as about 200 grams of the second sugar alcohol per day.

24. The method of claim 17 wherein the first post-partum period starts about the time the ruminant gives birth.

25. The method of claim 17 wherein the first post-patum period ends about four weeks after the ruminant gives birth.

26. The method of claim 17 wherein the second sugar alcohol comprises adonitol, allitol, altritol, arabinitol, dulcitol, erythritol, galaxitol, glucitol, glycerol, iditol, inositol, isomalt, lactitol, maltitol, mannitol, perseitol, ribitol, rhamnitol, threitol, sorbitol, xylitol, or any of these in any combination.

27. The method of claim 17 wherein the second sugar alcohol comprises sorbitol.

28. The method of claim 17 wherein the ruminant of claim 17 is a first ruminant, the first ruminant ingesting from about 50 grams to about 200 grams of sugar alcohol per day during the pre-partum period and during the first post-partum period and exhibiting the enhanced milk production after giving birth, as compared to milk production by a second ruminant after giving birth, the second ruminant fed identically as the first ruminant, with the exception that feed provided to the second ruminant during the pre-partum period, and during the first post-partum period is free of any sugar alcohol, the first ruminant and the second ruminant substantially identical to each other.

29. The method of claim 17 wherein the ruminant of claim 17 is a first ruminant, the first ruminant ingesting from about 50 grams to about 200 grams of sugar alcohol per day during the pre-partum period and during the first post-partum period and exhibiting enhanced production of 4% fat corrected milk after giving birth, as compared to production of 4% fat corrected milk by a second ruminant after giving birth, the second ruminant fed identically as the first ruminant, with the exception that feed provided to the second ruminant during the pre-partum period and during the first post-partum period is free of any sugar alcohol, the first ruminant and the second ruminant substantially identical to each other.

30. The method of claim 17 wherein the ruminant of claim 17 is a first ruminant, the first ruminant exhibiting enhanced daily feed intake on a dry basis after giving birth, as compared to daily dry basis feed intake by a second ruminant after giving birth, the second ruminant fed identically as the first ruminant, with the exception that feed provided to the second ruminant during the pre-partum period is free of any sugar alcohol, the first ruminant and the second ruminant substantially identical to each other.

31. The method of claim 17 wherein the ruminant of claim 17 is a first ruminant, the first ruminant ingesting from about 50 grams to about 200 grams of sugar alcohol per day during the pre-partum period and during the first post-partum period and producing milk with an enhanced component concentration after giving birth, as compared to the concentration of the component in milk produced by a second ruminant after giving birth, the second ruminant fed identically as the first ruminant, with the exception that feed provided to the second ruminant during the pre-partum period and during the first post-partum period is free of any sugar alcohol, the first ruminant and the second ruminant substantially identical to each other.

32. The method of claim 31 wherein the component of the milk is total fat, true protein, lactose, total solids, or any of these in any combination.

33. A method of feeding a ruminant, the method comprising:
providing a feed that comprises sugar alcohol and at least one additional feed component, the sugar alcohol comprising adonitol, allitol, altritol, arabinitol, dulcitol, erythritol, galaxitol, glucitol, iditol, inositol, isomalt, lactitol, maltitol, mannitol, perseitol, ribitol, rhamnitol, threitol, sorbitol, xylitol, or any of these in any combination; and
orally supplying the feed to the ruminant during a pre-partum period starting about three weeks before the ruminant gives birth, the ruminant ingesting the feed and sugar alcohol during the pre-partum period.

34. The method of claim 33 wherein the ruminant ingests as little as about 50 grams of sugar alcohol per day during the pre-partum period.

35. The method of claim 34 wherein the ruminant ingests as much as about 200 grams of sugar alcohol per day during the pre-partum period.

36. The method of claim 33 wherein the ruminant ingests as much as about 200 grams of sugar alcohol per day during the pre-partum period.

37. The method of claim 33 wherein the average daily sugar alcohol ingestion of the ruminant during the pre-partum period is as low as about 50 grams of sugar alcohol per day.

38. The method of claim 37 wherein the average daily sugar alcohol ingestion of the ruminant during the pre-partum period is as high as about 200 grams of sugar alcohol per day.

39. The method of claim 33 wherein the average daily sugar alcohol ingestion of the ruminant during the pre-partum period is as high as about 200 grams of sugar alcohol per day.

40. The method of claim 33 wherein the pre-partum period ends at about the time the ruminant gives birth.

41. The method of claim 33 wherein the sugar alcohol is sorbitol.

42. The method of claim 33 wherein the ruminant of claim 33 is a first ruminant, the first ruminant ingesting from about 50 grams to about 200 grams of sugar alcohol per day during the pre-partum period and exhibiting enhanced milk production after giving birth, as compared to milk production by a second ruminant after giving birth, the second ruminant fed identically as the first ruminant, with the exception that feed provided to the second ruminant during the pre-partum period is free of sugar alcohol, the first ruminant and the second ruminant substantially identical to each other.

43. The method of claim 33 wherein the ruminant of claim 33 is a first ruminant, the first ruminant ingesting from about 50 grams to about 200 grams of sugar alcohol per day during the pre-partum period and exhibiting enhanced production of 4% fat corrected milk after giving birth, as compared to production of 4% fat corrected milk by a second ruminant after giving birth, the second ruminant fed identically as the first ruminant, with the exception that feed provided to the second ruminant during the pre-partum period is free of sugar alcohol, the first ruminant and the second ruminant substantially identical to each other.

44. The method of claim 33 wherein the ruminant of claim 33 is a first ruminant, the first ruminant exhibiting enhanced daily feed intake on a dry basis after giving birth, as compared to daily dry basis feed intake by a second ruminant after giving birth, the second ruminant fed identically as the first ruminant, with the exception that feed provided to the second ruminant during the pre-partum period is free of sugar alcohol, the first ruminant and the second ruminant substantially identical to each other.

45. The method of claim 33 wherein the ruminant of claim 33 is a first ruminant, the first ruminant ingesting from about 50 grams to about 200 grams of sugar alcohol per day during the pre-partum period and producing milk with an enhanced component concentration after giving birth, as compared to the concentration of the component in milk produced by a second ruminant after giving birth, the second ruminant fed identically as the first ruminant, with the exception that feed provided to the second ruminant during the pre-partum period is free of sugar alcohol, the first ruminant and the second ruminant substantially identical to each other.

46. The method of claim 45 wherein the component of the milk is total fat, true, protein, lactose, total solids, or any of these in any combination.

47. The method of claim 33 wherein the feed provided during the pre-partum period is a pre-partum feed and the sugar alcohol provided during the pre-partum period is a first sugar alcohol, the method further comprising
providing a first post-partum feed that comprises a second sugar alcohol and at least one additional feed component; and
orally supplying the first post-partum feed to the ruminant during a first post-partum period that starts after the ruminant gives birth, the ruminant ingesting the first post-partum feed and the second sugar alcohol during the first post-partum period.

48. The method of claim 47 wherein the ruminant ingests as little as about 50 grams of the second sugar alcohol per day during the first post-partum period.

49. The method of claim 48 wherein the ruminant ingests as much as about 200 grams of the second sugar alcohol per day during the first post-partum period.

50. The method of claim 47 wherein the ruminant ingests as much as about 200 grams of the second sugar alcohol per day during the first post-partum period.

51. The method of claim 47 wherein the average daily sugar alcohol ingestion during the first post-partum period is as low as about 50 grams of the second sugar alcohol per day.

52. The method of claim 51 wherein the average daily sugar alcohol ingestion of the ruminant during the first post-partum period is as high as about 200 grams of the second sugar alcohol per day.

53. The method of claim 47 wherein the average daily sugar alcohol ingestion of the ruminant during the first post-partum period is as high as about 200 grams of the second sugar alcohol per day.

54. The method of claim 47 wherein the first post-partum period starts about the time the ruminant gives birth.

55. The method of claim 47 wherein the first post-partum period ends about four weeks after the ruminant gives birth.

56. The method of claim 47 wherein the second sugar alcohol of claim 48 comprises adonitol, allitol, altritol, arabinitol, dulcitol, erythritol, galaxitol, glucitol, iditol, inositol, isomalt, lactitol, maltitol, mannitol, perseitol, ribitol, rhamnitol, threitol, sorbitol, xylitol, or any of these in any combination.

57. The method of claim 47 wherein the second sugar alcohol of claim 48 comprises sorbitol.

58. The method of claim 47 wherein the ruminant of claim 48 is a first ruminant, the first ruminant ingesting from about 50 grams to about 200 grams of sugar alcohol per day during the pre-partum period and during the first post-partum period and exhibiting enhanced milk production after giving birth, as compared to milk production by a second ruminant after giving birth, the second ruminant fed identically as the first ruminant, with the exception that feed provided to the second ruminant during the pre-partum period and during the first post-partum period is free of any sugar alcohol, the first ruminant and the second ruminant substantially identical to each other.

59. The method of claim 47 wherein the ruminant of claim 48 is a first ruminant, the first ruminant ingesting from about 50 grams to about 200 grams of sugar alcohol per day during the pre-partum period and during the first post-partum period and exhibiting enhanced production of 4% fat corrected milk after giving birth, as compared to production of 4% fat corrected milk by a second ruminant after giving birth, the second ruminant fed identically as the first ruminant, with the exception that feed provided to the second ruminant during the pre-partum period and during the first post-partum period is free of any sugar alcohol, the first ruminant and the second ruminant substantially identical to each other.

60. The method of claim 47 wherein the ruminant of claim 48 is a first ruminant, the first ruminant exhibiting enhanced daily feed intake on a dry basis after giving birth, as compared to daily dry basis feed intake by a second ruminant after giving birth, the second ruminant fed identically as the first ruminant, with the exception that feed provided to the second ruminant during the pre-partum period is free of any sugar alcohol, the first ruminant and the second ruminant substantially identical to each other.

61. The method of claim 47 wherein the ruminant of claim 48 is a first ruminant, the first ruminant ingesting from about 50 grams to about 200 grams of sugar alcohol per day during the pre-partum period and during the first post-partum period and producing milk with an enhanced component concentration after giving birth, as compared to the concentration of the component in milk produced by a second ruminant after giving birth, the second ruminant fed identically as the first ruminant, with the exception that feed provided to the second ruminant during the pre-partum period and during the first post-partum period is free of any sugar alcohol, the first ruminant and the second ruminant substantially identical to each other.

62. The method of claim 61 wherein the component of the milk is total fat, true protein, lactose, total solids, or any of these in any combination.

63. A method of feeding a ruminant, the method comprising:
providing a feed that comprises sorbitol and at least one additional feed component, the feed free of glycerol and the sorbitol fully digestible in the rumen of the ruminant; and
orally supplying the feed to the ruminant during a pre-partum period when the ruminant is pregnant, the ruminant ingesting the feed and the sorbitol during the pre-partum period, the pre-partum period starting no more than about eight weeks before the ruminant gives birth.

64. The method of claim 63 wherein the ruminant ingests as little as about 50 grams of sorbitol per day during the pre-partum period.

65. The method of claim 64 wherein the ruminant ingests as much as about 200 grams of sorbitol per day during the pre-partum period.

66. The method of claim 63 wherein the ruminant ingests as much as about 200 grams of sorbitol per day during the pre-partum period.

67. The method of claim 63 wherein the average daily sorbitol ingestion of the ruminant during the pre-partum period is as low as about 50 grams of sorbitol per day.

68. The method of claim 67 wherein the average daily sorbitol ingestion of the ruminant during the pre-partum period is as high as about 200 grams of sorbitol per day.

69. The method of claim 63 wherein the average daily sorbitol ingestion of the ruminant during the pre-partum period is as high as about 200 grams of sorbitol per day.

70. The method of claim 63 wherein the pre-partum period starts about three weeks before the ruminant gives birth.

71. The method of claim 70 wherein the pre-partum period ends at about the time the ruminant gives birth.

72. A method of feeding a ruminant, the method comprising:
providing a pre-partum feed that comprises sugar alcohol and at least one additional feed component, the pre-partum feed free of glycerol and the sugar alcohol fully digestible in the rumen of the ruminant;
orally supplying the pre-partum feed to the ruminant during a pre-partum period when the ruminant is pregnant, the ruminant ingesting the pre-partum feed and the first sugar alcohol during the pre-partum period, the pre-partum period starting no more than about eight weeks before the ruminant gives birth;
providing a first post-partum feed that comprises a second sugar alcohol and at least one additional feed component, wherein the second sugar alcohol comprises adonitol, allitol, altritol, arabinitol, dulcitol, erythritol, galaxitol, glucitol, glycerol, iditol, inositol, isomalt, lactitol, maltitol, mannitol, perseitol, ribitol, rhamnitol, threitol, sorbitol, xylitol, or any of these in any combination; and
orally supplying the first post-partum feed to the ruminant during a first post-partum period that starts after the ruminant gives birth, the ruminant ingesting the first post-partum feed and the second sugar alcohol during the first post-partum period.

73. The method of claim 72 wherein the ruminant ingests as little as about 50 grams of the second sugar alcohol per day during the first post-partum period.

74. The method of claim 73 wherein the ruminant ingests as much as about 200 grams of the second sugar alcohol per day during the first post-partum period.

75. The method of claim 72 wherein the ruminant ingests as much as about 200 grams of the second sugar alcohol per day during the first post-partum period.

76. The method of claim 72 wherein the average daily sugar alcohol ingestion during the first post-partum period is as low as about 50 grams of the second sugar alcohol per day.

77. The method of claim 76 wherein the average daily sugar alcohol ingestion of the ruminant during the first post-partum period is as high as about 200 grams of the second sugar alcohol per day.

78. The method of claim 72 wherein the average daily sugar alcohol ingestion of the ruminant during the first post-partum period is as high as about 200 grams of the second sugar alcohol per day.

79. The method of claim 72 wherein the first post-partum period starts about the time the ruminant gives birth.

80. The method of claim 72 wherein the first post-partum period ends about four weeks after the ruminant gives birth.

81. The method of claim 72 wherein the first post-partum feed is free of glycerol and the second sugar alcohol is fully digestible in the rumen of the ruminant.

82. The method of claim 72 wherein the first sugar alcohol comprises sorbitol.

83. The method of claim 1 wherein the feed comprises less than 5 weight percent rumen-protected fatty acid, based on the total weight of the feed.

84. The method of claim 1 wherein the feed is free of rumen-protected fatty acid.

* * * * *

UNITED STATES PATENT AND TRADEMARK OFFICE
CERTIFICATE OF CORRECTION

PATENT NO.        : 8,110,214 B2
APPLICATION NO.   : 10/745286
DATED             : February 7, 2012
INVENTOR(S)       : Porter et al.

It is certified that error appears in the above-identified patent and that said Letters Patent is hereby corrected as shown below:

SPECIFICATION

| Column | Line | PTO | Should Read |
|---|---|---|---|
| 10 | 14 | "female, ruminant(s) by" | --female ruminant(s) by-- |
| 11 | 31 | "seventy-five, grams per" | --seventy-five grams per-- |
| 14 | 51 | "early postpartum" | --early post-partum-- |
| 15 | 17 | "early postpartum" | --early post-partum-- |
| 15 | 24 | "early postpartum" | --early post-partum-- |
| 17 | 12 | "calorimetric method" | --colorimetric method-- |
| 17 | 19 | "calorimetrically" | --colorimetrically-- |
| 17 | 64 | "all the sane," | --all the same,-- |
| 18 | 29 | "second postpartum" | --second post-partum-- |
| 18 | 30 | "third postpartum" | --third post-partum-- |
| 18 | 40 | "first postpartum" | --first post-partum-- |
| 18 | 41 | "early postpartum" | --early post-partum-- |
| 18 | 46 | "first postpartum" | --first post-partum-- |
| 18 | 47 | "early postpartum" | --early post-partum-- |
| 18 | 49 | "second postpartum" | --second post-partum-- |
| 18 | 52 | "third postpartum" | --third post-partum-- |
| 18 | 54 | "second postpartum" | --second post-partum-- |
| 18 | 56 | "second postpartum" | --second post-partum-- |
| 24 | 7  | "early postpartum" | --early post-partum-- |
| 24 | 23 | "second postpartum" | --second post-partum-- |
| 24 | 35 | "second postpartum" | --second post-partum-- |
| 24 | 36 | "second postpartum" | --second post-partum-- |

Signed and Sealed this
Tenth Day of July, 2012

David J. Kappos
*Director of the United States Patent and Trademark Office*

CERTIFICATE OF CORRECTION (continued)
U.S. Pat. No. 8,110,214 B2

SPECIFICATION

| Column | Line | PTO | Should Read |
|---|---|---|---|
| 24 | 43 | "early postpartum" | --early post-partum-- |
| 24 | 61 | "third postpartum" | --third post-partum-- |
| 27 | 32 | "(P=0.0)" | --(P=0.01)-- |
| 40 | 42 | "early postpartum" *[Last row, under column Table "Target*"]:* | --early post-partum-- |
| 43, Line 6 | 27 | "0.7" | --<0.7-- |